(12) United States Patent
Morimoto et al.

(10) Patent No.: US 11,130,526 B2
(45) Date of Patent: Sep. 28, 2021

(54) REAR BODY STRUCTURE FOR VEHICLES

(71) Applicant: MAZDA MOTOR CORPORATION, Hiroshima (JP)

(72) Inventors: Makoto Morimoto, Hiroshima (JP); Nobuyuki Nakayama, Aki-gun (JP); Harumitsu Kubota, Hiroshima (JP); Yasunori Isshiki, Aki-gun (JP); Taichi Hirakawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 177 days.

(21) Appl. No.: 16/610,496

(22) PCT Filed: May 1, 2018

(86) PCT No.: PCT/JP2018/017465
§ 371 (c)(1),
(2) Date: Nov. 2, 2019

(87) PCT Pub. No.: WO2018/207688
PCT Pub. Date: Nov. 15, 2018

(65) Prior Publication Data
US 2020/0156706 A1    May 21, 2020

(30) Foreign Application Priority Data
May 8, 2017    (JP) .............................. JP2017-092586

(51) Int. Cl.
*B62D 21/15*    (2006.01)
*B60K 1/04*    (2019.01)
(Continued)

(52) U.S. Cl.
CPC .............. *B62D 21/155* (2013.01); *B60K 1/04* (2013.01); *B62D 21/11* (2013.01); *B62D 25/02* (2013.01);
(Continued)

(58) Field of Classification Search
CPC ...... B62D 21/155; B62D 21/11; B62D 25/02; B62D 25/08; B62D 25/087;
(Continued)

(56) References Cited

U.S. PATENT DOCUMENTS

2013/0249243 A1    9/2013    Lee et al.
2014/0368000 A1    12/2014    Komiya
(Continued)

FOREIGN PATENT DOCUMENTS

CN    203020001 U  *  6/2013
EP    3069962 A1    9/2016
(Continued)

OTHER PUBLICATIONS

International Search Report issued in PCT/JP2018/017465; dated Jul. 24, 2018.
(Continued)

*Primary Examiner* — Pinel E Romain
(74) *Attorney, Agent, or Firm* — Studebaker & Brackett PC

(57) ABSTRACT

A vehicle body rear part structure for a vehicle includes a rear subframe disposed below a rear side frame and extending in a vehicle body front-rear direction. The rear subframe includes a front load absorbing portion and a rear load absorbing portion which extend rearwardly of a vehicle body from an important safety related component disposed on a vehicle body rear part, are disposed on a vehicle body rear side with respect to the important safety related component, and are configured to absorb a collision load when the collision load from rearwardly of the vehicle body is applied. The rear load absorbing portion is disposed on the vehicle body rear side of the front load absorbing portion. Strength of the rear load absorbing portion against compres-
(Continued)

VEHICLE BODY FRONT SIDE ← → VEHICLE BODY REAR SIDE sion in an axis direction is set low, as compared with strength of the front load absorbing portion.

13 Claims, 21 Drawing Sheets

(51) Int. Cl.
  *B62D 21/11* (2006.01)
  *B62D 25/02* (2006.01)
  *B62D 25/08* (2006.01)
  *H01M 50/20* (2021.01)

(52) U.S. Cl.
  CPC ............ *B62D 25/08* (2013.01); *H01M 50/20* (2021.01); *H01M 2220/20* (2013.01)

(58) Field of Classification Search
  CPC .............. B62D 25/2027; H01M 50/20; H01M 2220/20; B60K 1/04; Y02E 60/10
  USPC ....................................................... 296/187.11
  See application file for complete search history.

(56) References Cited

U.S. PATENT DOCUMENTS

| | | | |
|---|---|---|---|
| 2016/0052556 A1* | 2/2016 | Kano | B62D 21/155 296/187.08 |
| 2016/0288837 A1 | 10/2016 | Sagara et al. | |
| 2020/0385058 A1* | 12/2020 | Kubota | B62D 21/02 |

FOREIGN PATENT DOCUMENTS

| | | |
|---|---|---|
| JP | S62-008880 U | 1/1987 |
| JP | 2010-247622 A | 11/2010 |
| JP | 2011-143871 A | 7/2011 |
| JP | 2013-169810 A | 9/2013 |
| JP | 2016-043829 A | 4/2016 |
| JP | 2016-052862 A | 4/2016 |
| WO | 2013-121783 A1 | 8/2013 |

OTHER PUBLICATIONS

The extended European search report issued by the European Patent Office dated Apr. 2, 2020, which corresponds to European Patent Application No. 18798406.7-1009 and is related to U.S. Appl. No. 16/610,496.

\* cited by examiner

FIG.19
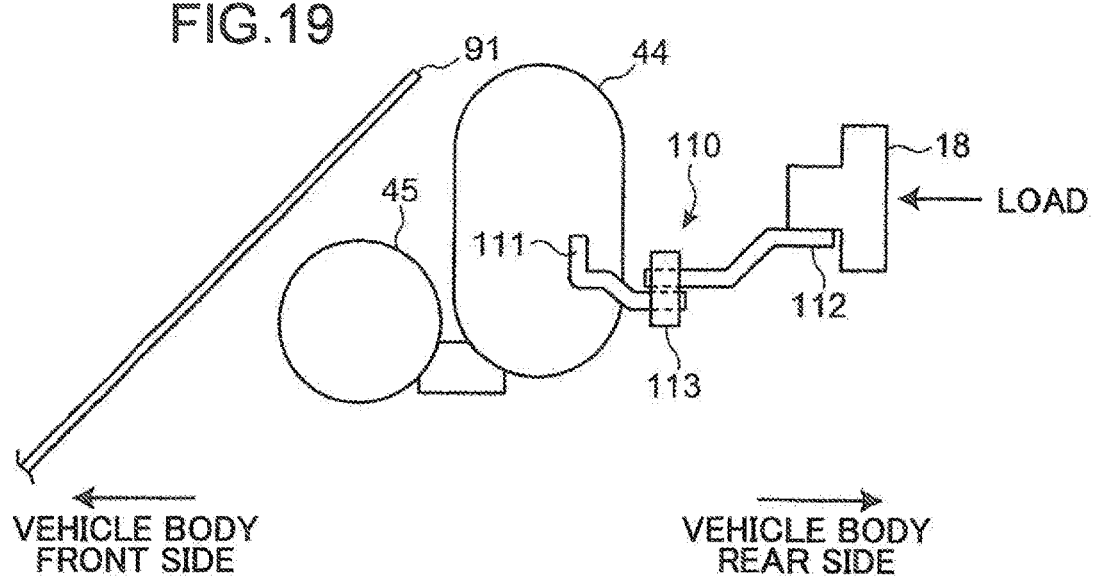
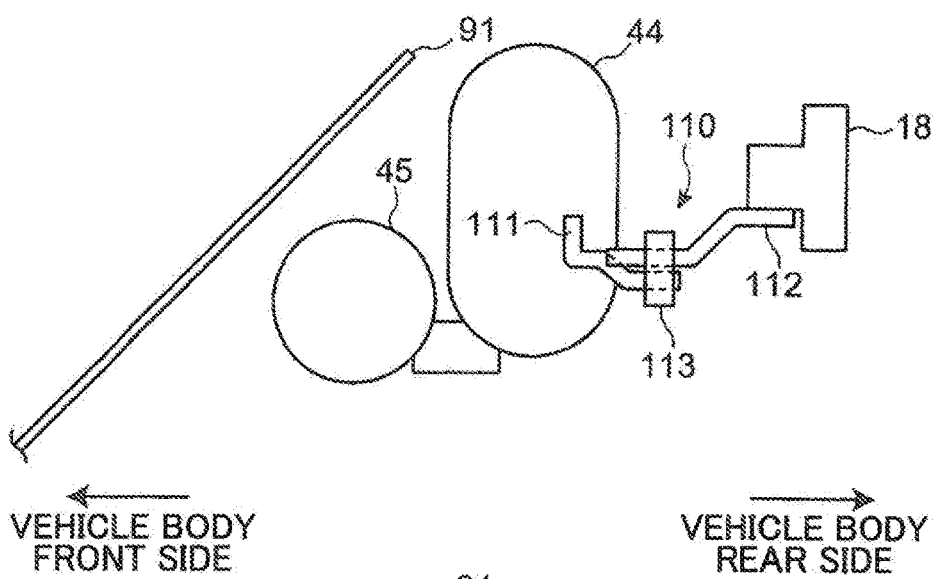
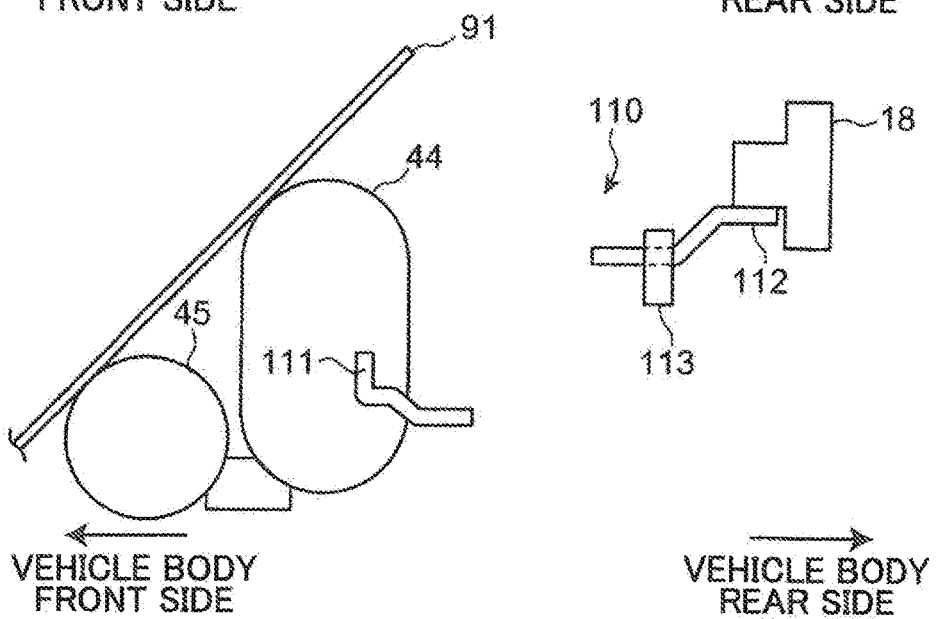

REAR BODY STRUCTURE FOR VEHICLES

TECHNICAL FIELD

The present invention relates to a vehicle body rear part structure for a vehicle, and more particularly, to a vehicle body rear part structure for a vehicle provided with a rear subframe disposed below a rear side frame.

BACKGROUND ART

In a vehicle such as an automobile, there is known a vehicle body rear part in which a rear subframe for supporting an engine, a transmission, and the like is disposed below a rear side frame extending in a vehicle body front-rear direction, and the rear subframe is connected to the rear side frame.

For example. Patent Literature 1 discloses a configuration in which a rear subframe is disposed below a rear side frame, and the rear subframe is connected to the rear side frame. For example, Patent Literature 2 discloses a configuration in which a rear subframe for mounting an engine, and a rear subframe for mounting a transmission are disposed below a vehicle body rear part, the rear subframe for mounting the engine is fixed to a vehicle body frame, and the rear subframe for mounting the transmission is fixed to the rear subframe for mounting the engine and the vehicle body frame.

In a vehicle such as an automobile, there is a demand for improving safety of a passenger within a passenger compartment, when a collision load is applied from rearwardly of a vehicle body in rear surface collision (rear collision). Also, in a vehicle in which a rear subframe is disposed below a rear side frame, there is a demand for improving safety of a passenger within a passenger compartment in rear collision.

Furthermore, in a vehicle such as an electric vehicle in which a rear subframe is disposed below a rear side frame, when important safety related components such as an engine, a power generator, and a fuel tank are disposed on a vehicle body rear part, it is desired to protect the important safety related components disposed on the vehicle body rear part when a collision load is applied from rearwardly of a vehicle body in rear collision.

CITATION LIST

Patent Literature

Patent Literature 1: Japanese Unexamined Patent Application Publication No. 2016-43829
Patent Literature 2: Japanese Unexamined Utility Model Application Publication No. S62-8880

SUMMARY OF INVENTION

An object of the present invention is to provide, in a vehicle provided with a rear subframe disposed below a rear side frame, a vehicle body rear part structure for a vehicle which enables to protect an important safety related component disposed on a vehicle body rear part by absorbing a collision load in rear collision, and to improve safety of a passenger within a passenger compartment.

The present invention is directed to a vehicle body rear part structure for a vehicle including a rear side frame extending in a vehicle body front-rear direction on a vehicle body rear part, and a rear subframe disposed below the rear side frame and extending in the vehicle body front-rear direction. The rear subframe includes a front load absorbing portion and a rear load absorbing portion which extend rearwardly of a vehicle body from an important safety related component disposed on the vehicle body rear part, are disposed on a vehicle body rear side with respect to the important safety related component, and are configured to absorb a collision load when the collision load from rearwardly of the vehicle body is applied. The rear load absorbing portion is disposed on the vehicle body rear side of the front load absorbing portion. Strength of the rear load absorbing portion against compression in an axis direction is set low, as compared with strength of the front load absorbing portion.

BRIEF DESCRIPTION OF DRAWINGS

FIG. 19, of sections (a) to (c), are explanatory diagrams illustrating how the silencer moves in rear collision.

DESCRIPTION OF EMBODIMENTS

In the following, embodiments of the present invention are described with reference to the accompanying drawings.

Figure 1:
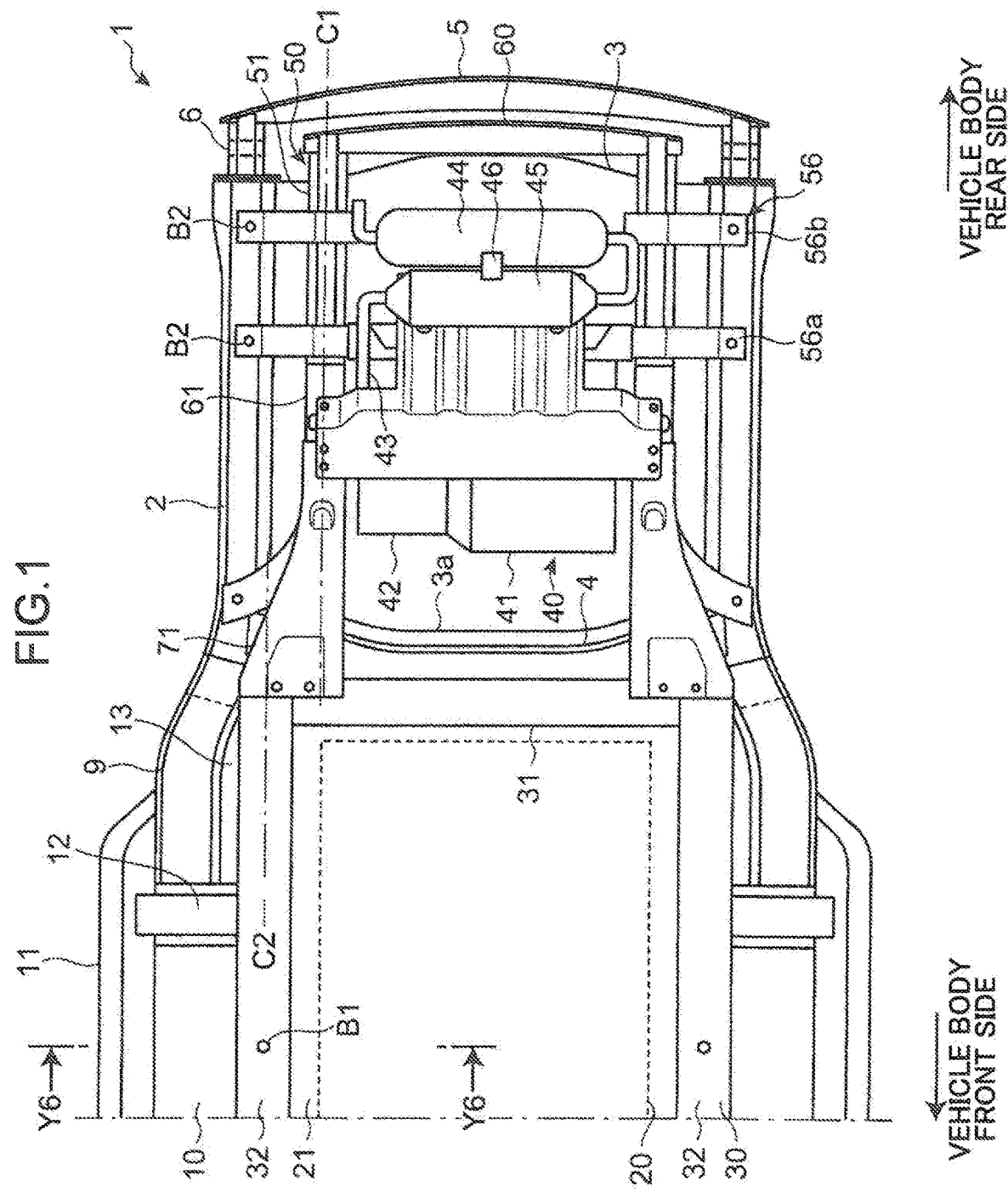
FIG. 1 is a bottom view of a vehicle body to which a vehicle body rear part structure for a vehicle according to a first embodiment of the present invention is applied.
Figure 2:
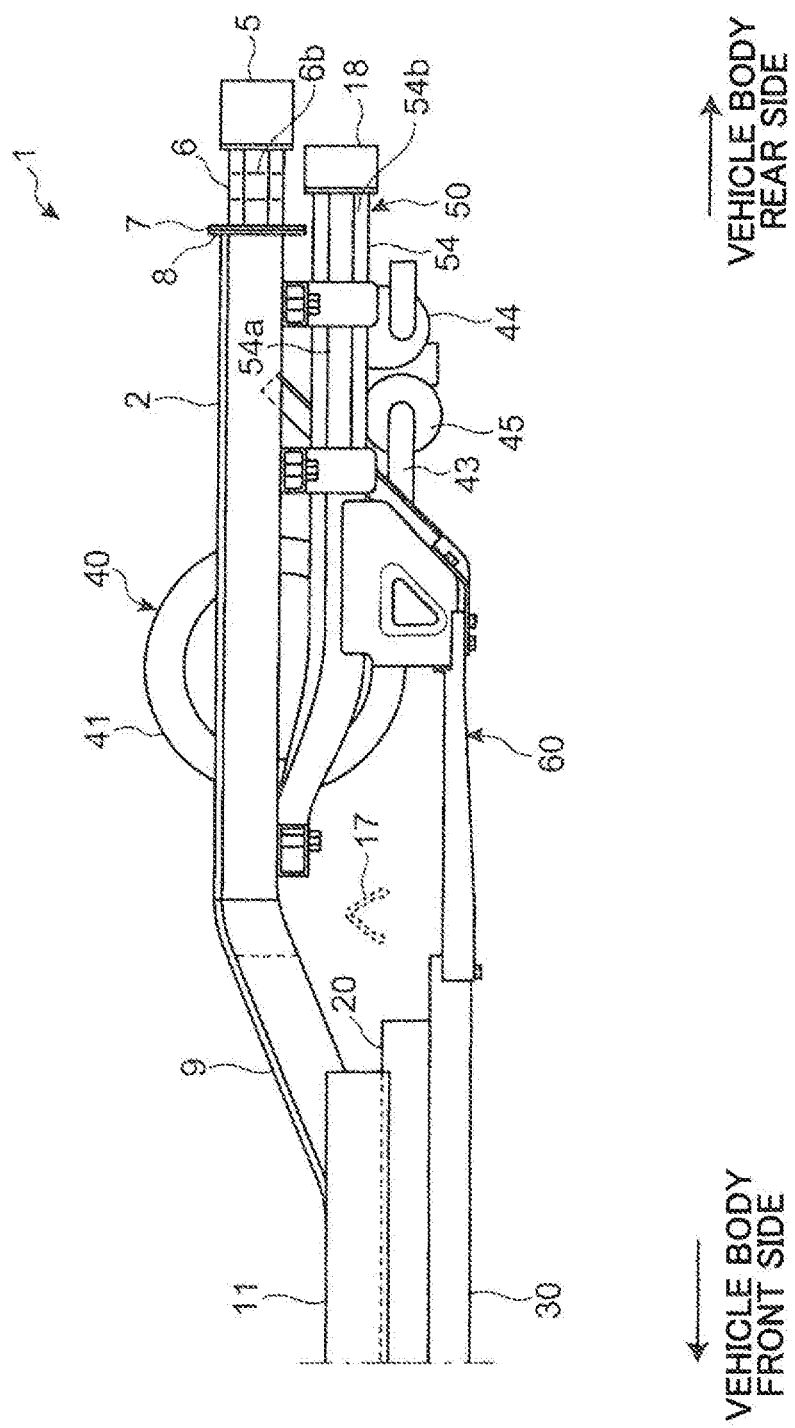
FIG. 2 is a side view of the vehicle body to which the vehicle body rear part structure is applied.
Figure 3:
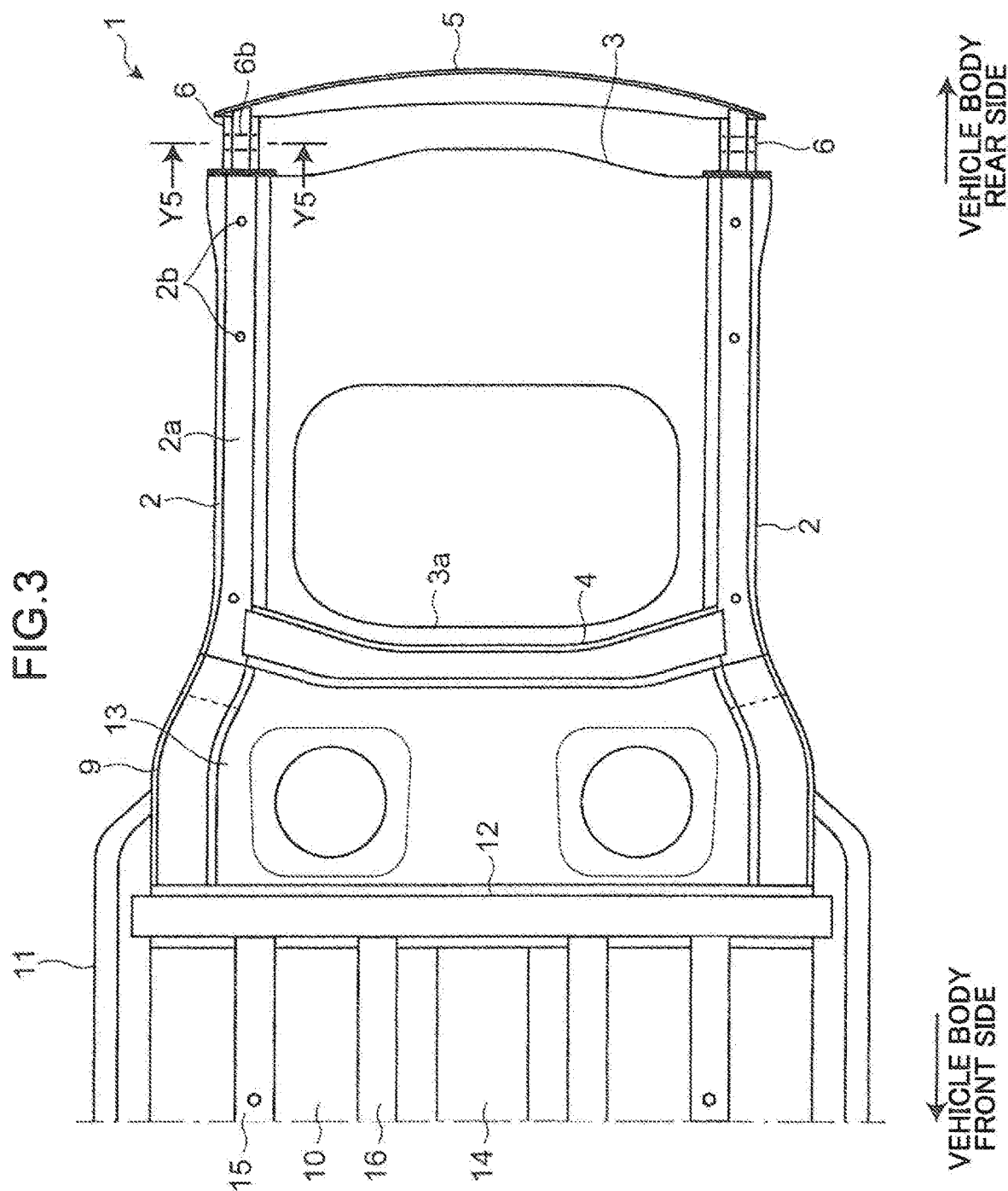
FIG. 3 is a bottom view of the vehicle body illustrated in FIG. 1, except for a subframe unit and a battery frame.
Figure 4:
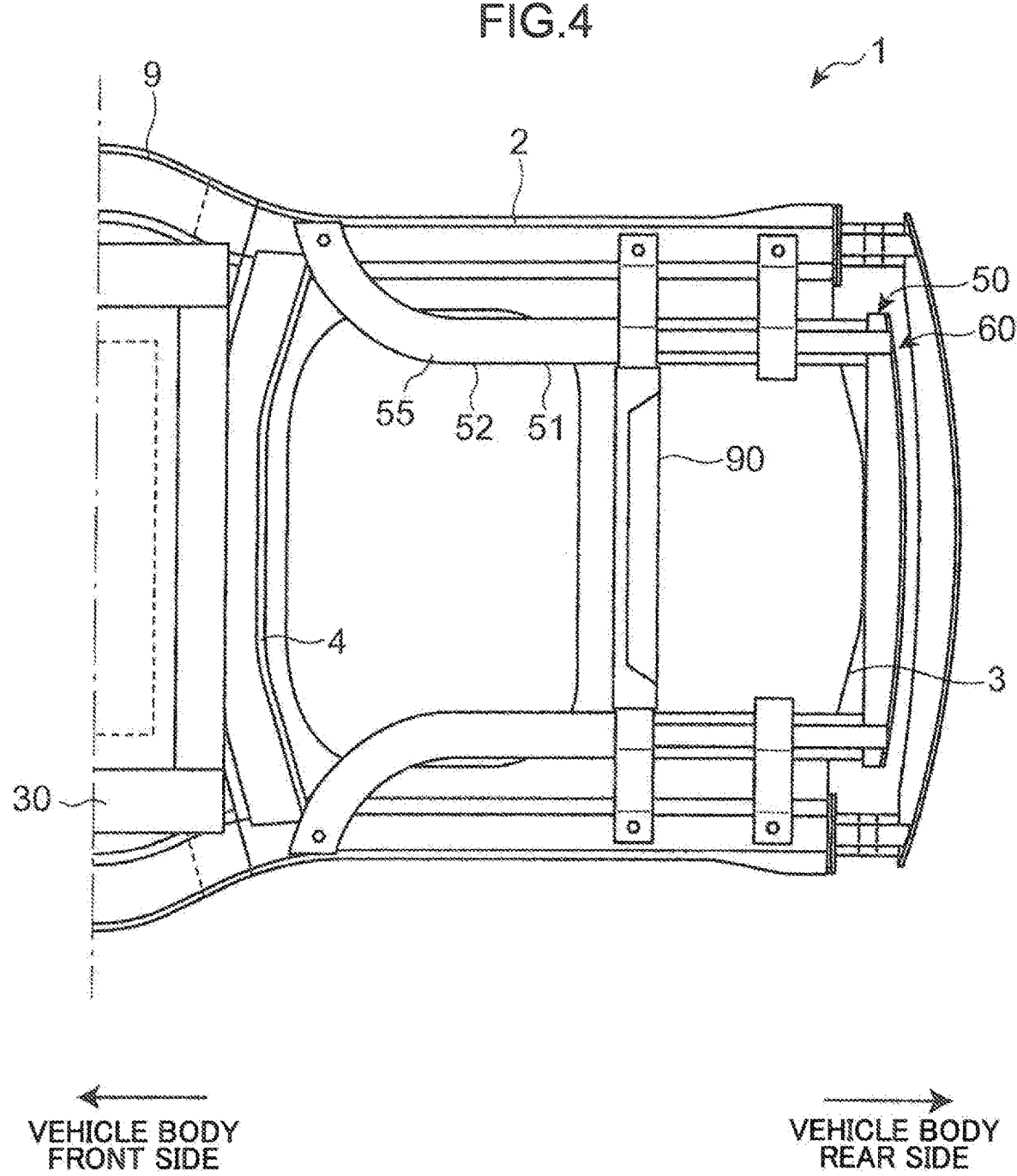
FIG. 4 is a bottom view of the vehicle body illustrated in FIG. 1, except for a part of the subframe unit.
Figure 5:
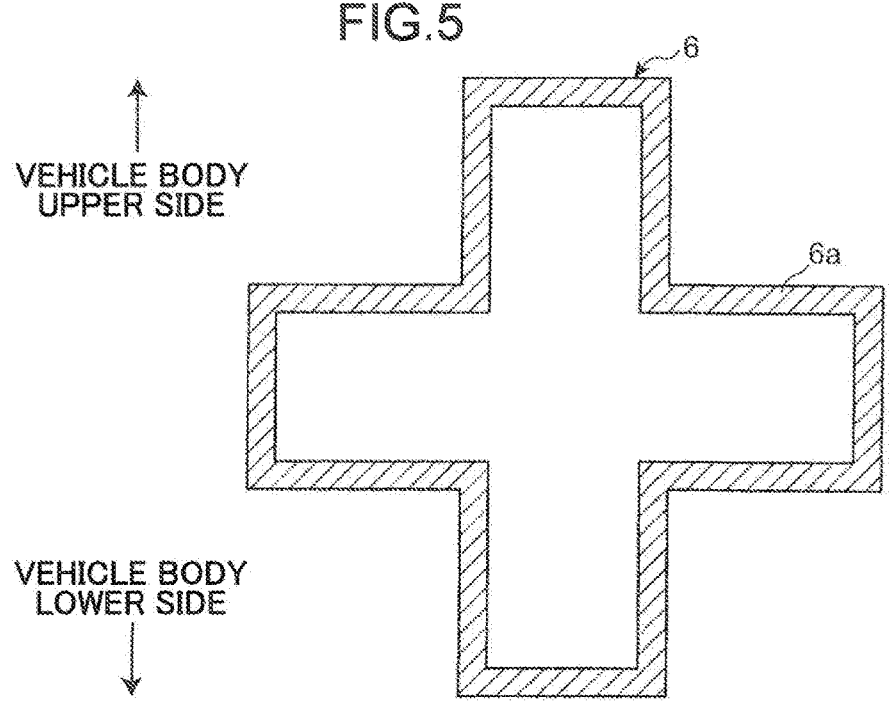
FIG. 5 is a cross-sectional view of the vehicle body taken along the line Y5-Y5 in FIG. 3.
Figure 6:
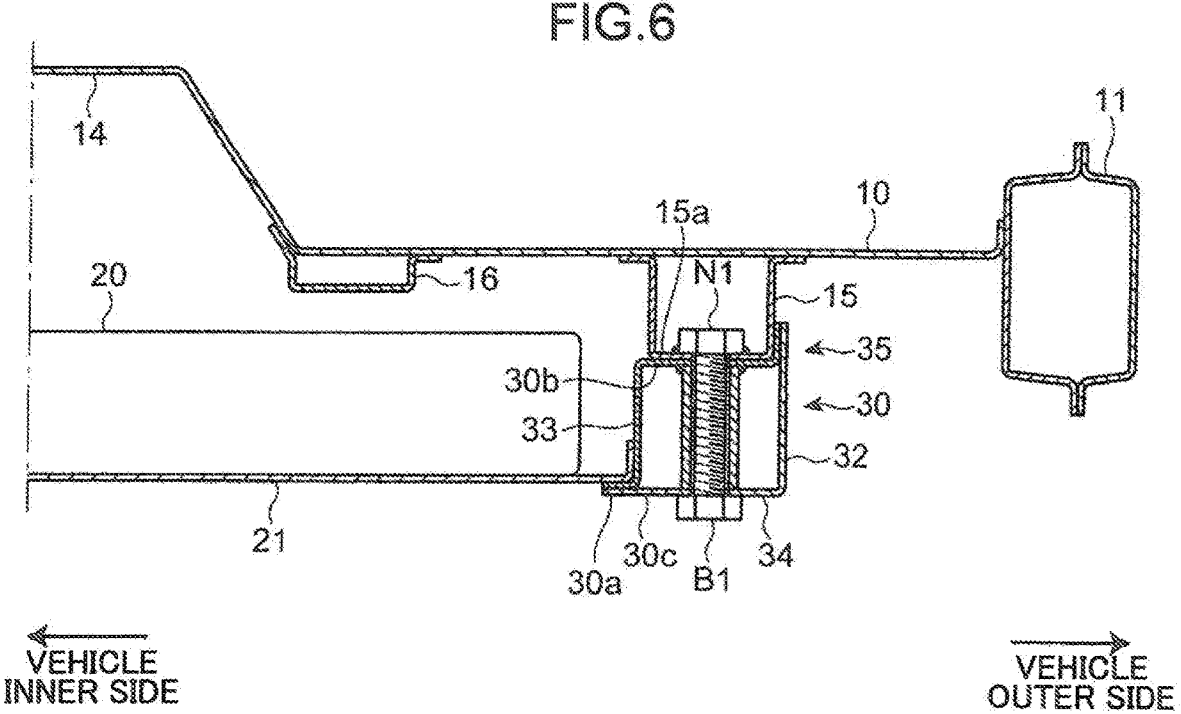
FIG. 6 is a cross-sectional view of the vehicle body taken along the line Y6-Y6 in FIG. 1.

FIG. 1 is a bottom view of a vehicle body to which a vehicle body rear part structure for a vehicle according to a first embodiment of the present invention is applied. FIG. 2 is a side view of the vehicle body to which the vehicle body rear part structure for a vehicle is applied. FIG. 3 is a bottom view of the vehicle body illustrated in FIG. 1, except for a subframe unit and a battery frame. FIG. 4 is a bottom view of the vehicle body illustrated in FIG. 1, except for a part of the subframe unit. FIG. 5 is a cross-sectional view of the vehicle body taken along the line Y5-Y5 in FIG. 3. FIG. 6 is a cross-sectional view of the vehicle body taken along the line Y6-Y6 in FIG. 1.

A vehicle body 1 to which a vehicle body rear part structure for a vehicle according to an embodiment of the present invention is applied is a vehicle body of an electric vehicle or the like provided with a drive motor as a drive source for driving the vehicle, and a battery for storing electric power to be supplied to the drive motor. A range extender device for extending a cruising distance is provided in the vehicle body 1. The range extender device includes a power generator for generating driving electric power to be supplied to the battery, and an engine as a drive source for driving the power generator. In the vehicle body 1, the drive motor is disposed on a vehicle body front part, the battery is disposed below a passenger compartment floor portion, and the range extender device is disposed on a vehicle body rear part.

As illustrated in FIGS. 1 to 6, on the vehicle body rear part in the vehicle body 1, a pair of left and right rear side frames 2 extending in a vehicle body front-rear direction, and a rear subframe 50 extending in the vehicle body front-rear direction along the left and right rear side frames 2 at a position below the left and right rear side frames 2, are disposed. The rear side frames 2 and the rear subframe 50 are formed of a plate-shaped member using a metal material.

Also on the vehicle body rear part, a rear floor portion 3 constituted of a rear floor panel spanning between the left and right rear side frames 2 and extending in the vehicle body front-rear direction, and a first cross member 4 spanning between the left and right rear side frames 2 on a lower surface side of the rear floor portion 3 are disposed.

An opening portion 3a is formed in the rear floor portion 3 for disposing a range extender device 40, in which a power generator 41 for generating driving electric power to be supplied to a battery 20, and an engine 42 for driving the power generator 41 are integrally mounted. The first cross member 4 is disposed on a vehicle body front side of the opening portion 3a.

The rear side frame 2 is formed into a substantially U-shape in cross section and is mounted on a lower surface of the rear floor portion 3, and, in cooperation with the rear floor portion 3, is formed into a closed cross section of a substantially rectangular shape in cross section extending in the vehicle body front-rear direction. The first cross member 4 is formed into a substantially hat shape in cross section and is mounted on a lower surface of the rear floor portion 3, and, in cooperation with the rear floor portion 3, is formed into a closed cross section of a substantially rectangular shape in cross section extending in the vehicle width direction.

A crash can 6, as a load absorbing portion extending in the vehicle body front-rear direction, is formed on a vehicle body rear end of each of the left and right rear side frames 2. The crash cans 6 are respectively attached to both ends of a side frame bumper reinforcement 5, which is disposed within a rear bumper (not illustrated) extending in the vehicle width direction.

As illustrated in FIG. 5, the crash can 6 is formed into a closed cross section of a substantially polygonal shape in cross section in which an orthogonal cross section substantially orthogonal to an axis direction being the vehicle body front-rear direction has sides of a number larger than the number of sides of a rectangle. Specifically, the crash can 6 includes a closed cross-sectional portion 6a of a substantially cross shape in cross section, and a plurality of recess portions 6b, each of which extends in a direction substantially orthogonal to the axis direction. With this structure, when a collision load is applied from rearwardly of the vehicle body, the crash can 6 is folded back to be collapsed and deformed, and absorbs the collision load.

The crash can 6 is integrally formed into a closed cross section by subjecting a pipe member to hydro-forming process or the like. Alternatively, it is possible to form the crash can 6 into a substantially cross shape in cross section by joining a first plate-shaped member formed into a projection shape in cross section and projecting outwardly in the vehicle width direction, and a second plate-shaped member formed into a projection shape in cross section and projecting inwardly in the vehicle width direction.

As illustrated in FIG. 2, the crash can 6 is connected to the rear side frame 2 by engaging a first plate member 7 and a second plate member 8 using a bolt and a nut, the first plate member 7 being fixedly mounted to the crash can 6 by welding or the like and extending in a direction substantially orthogonal to the vehicle body front-rear direction, the second plate member 8 being fixedly mounted to the rear side frame 2 by welding or the like and extending in a direction substantially orthogonal to the vehicle body front-rear direction.

In the vehicle body 1, the rear side frame 2 is formed into a closed cross section in cooperation with the rear floor portion 3. Alternatively, the rear side frame 2 itself may be formed into a closed cross section shape of a substantially rectangular shape in cross section. Furthermore, the crash can 6 is provided on a vehicle body rear part of the rear side frame 2 via the first plate member 7 and the second plate member 8. Alternatively, the crash can 6 may be integrally formed with the rear side frame 2.

Furthermore, in the vehicle body 1, by providing the crash can 6 on the rear side frame 2, a portion of the rear side frame 2 where the crash can 6 is formed becomes a load absorbing portion, that is, a portion where the strength against compression in the axis direction is small, as compared with the other portion of the rear side frame 2. Alternatively, a load absorbing portion may be provided on the rear side frame 2 by reducing a thickness of a part of steel plate forming the rear side frame 2 to decrease the strength against compression in the axis direction, for instance.

A front end of the rear side frame 2 is overlapped and joined to a rear end of a kick-up frame 9. A front end of the kick-up frame 9 is joined to a second cross member 12 spanning between left and right side sills 11 and extending in the vehicle width direction. The kick-up frame 9 is inclined outwardly in the vehicle width direction and downwardly of the vehicle body, as extending forwardly of the vehicle body. The left and right side sills 11 are disposed on both sides in the vehicle width direction of a passenger compartment floor portion 10 extending in the vehicle body front-rear direction, the passenger compartment floor portion 10 being constituted of a front floor panel forming a floor surface of a passenger compartment.

A kick-up portion 13 constituted of a kick-up panel spans between the left and right kick-up frames 9, the kick-up panel extending while being inclined upwardly of the vehicle body from a rear end of the passenger compartment floor portion 10, as extending rearwardly of the vehicle body. The rear floor portion 3 is provided in such a way as to extend from the kick-up portion 13 rearwardly of the vehicle body.

The kick-up frame 9 is mounted on a lower surface of the kick-up portion 13 while being formed into a substantially hat shape in cross section, and is formed, in cooperation with the kick-up portion 13, into a closed cross section of a substantially rectangular shape in cross section extending in the vehicle body front-rear direction. The second cross member 12 is mounted on a lower surface of the passenger compartment floor portion 10 while being formed into a substantially hat shape in cross section, and is formed, in cooperation with the passenger compartment floor portion 10, into a closed cross section of a substantially rectangular shape in cross section extending in the vehicle width direction.

As illustrated in FIG. 3, in the passenger compartment floor portion 10, a floor tunnel portion 14 is formed on a middle portion in the vehicle width direction, the floor tunnel portion 14 extending in the vehicle body front-rear direction and bulging upwardly of the vehicle body. A floor frame 15 extending in the vehicle body front-rear direction is mounted substantially on a middle between the floor tunnel portion 14, and the left and right side sills 11. A tunnel reinforcement 16 is mounted on both sides of the floor tunnel portion 14 in the vehicle width direction. The floor frame 15 and the tunnel reinforcement 16 are formed into a substantially hat shape in cross section, and joined to the passenger compartment floor portion 10.

In the vehicle body 1, the battery 20 is disposed below the passenger compartment floor portion 10. As illustrated in FIG. 6, the battery 20 is supported by the vehicle body 1, by being mounted on a battery frame 30 which supports the battery 20 in a state that the battery 20 is mounted on a battery tray 21, and by the battery frame 30 being connected to the passenger compartment floor portion 10.

The battery frame 30 includes: a front frame (not illustrated) disposed on the vehicle body front side and extending in the vehicle width direction; a rear frame 31 disposed on the vehicle body rear side and extending in the vehicle width direction; and both side lateral frames 32 extending in the vehicle body front-rear direction while respectively connecting both sides of the front frame in the vehicle width direction, and both sides of the rear frame 31 in the vehicle width direction. The both side lateral frames 32 are disposed on a vehicle body lower side of the left and right floor frames 15, and are mounted on the floor frames 15.

As illustrated in FIG. 6, each of the front frame, the rear frame 31, and the both side lateral frames 32 is constituted by an upper frame 33 of a substantially L-shape in cross section and constituting a vehicle body upper part of the battery frame 30, and a lower frame 34 of a substantially L-shape in cross section and constituting a vehicle body lower part of the battery frame 30. The upper frame 33 and the lower frame 34 are joined to each other to be formed into a closed cross section of a substantially rectangular shape in cross section. A flange portion 30a extending substantially horizontally and inwardly in the vehicle width direction is formed on the battery frame 30. The battery tray 21 is mounted on the flange portion 30a. The battery 20 is supported on the battery frame 30.

The battery frame 30, specifically, the lateral frame 32 is disposed substantially along the floor frame 15, and is connected to the floor frame 15. As illustrated in FIG. 6, regarding a frame connecting portion 35 connecting the battery frame 30 and the floor frame 15, connection is performed by placing an upper surface portion 30b of the battery frame 30 on a bottom surface portion 15a of the floor flame 15 and using a bolt B1 and a nut N1. A plurality of the frame connecting portions 35 are provided on the lateral frame 32 in the vehicle body front-rear direction.

In the vehicle body 1, the range extender device 40 including the power generator 41 and the engine 42 is disposed on the vehicle body rear part. The range extender device 40 is an accessary being an important safety related component in view of that the power generator 41 uses a high voltage. The range extender device 40 is disposed within the opening portion 3a of the rear floor portion 3, and is provided in such a way as to project upwardly of the vehicle body and downwardly of the vehicle body with respect to the rear floor portion 3.

On the vehicle body rear part also, a silencer 44 and a catalytic device 45 as exhaust system parts are disposed on an exhaust pipe 43 extending from the engine 42. The silencer 44 reduces noise generated when exhaust gas from the engine 42 is released into the air. The catalytic device 45 purifies exhaust gas from the engine 42. The silencer 44 and the catalytic device 45 are accessories which are not important safety related components, and are disposed in such a way as to extend in the vehicle width direction on the vehicle body lower side of the rear floor portion 3. Specifically, the catalytic device 45 is disposed on the vehicle body rear side of the range extender device 40, and the silencer 44 is disposed on the vehicle body rear side of the catalytic device 45. The silencer 44 and the catalytic device 45 are integrally connected by a connecting member 46.

Accessories to be disposed on the vehicle body rear part, specifically, the range extender device 40, the silencer 44, and the catalytic device 45 constitute a subframe unit 60 as a one-piece unit by being integrally mounted on the rear subframe 50. The entirety of the subframe unit 60 is mounted in the vehicle body 1. In this way, integrally forming the accessories 40, 44, and 45 to be disposed on the vehicle body rear part, and the rear subframe 50 as the one-piece unit 60 makes it easy to mount the one-piece unit 60 in the vehicle body 1, and enables to improve productivity in manufacturing the vehicle body, and safety.

On the vehicle body rear part also, a torsion beam suspension device including a pair of left and right trailing arms (not illustrated) extending in the vehicle body front-rear direction, and a torsion beam 17 (see the broken line in FIG. 2) connecting the pair of left and right trailing arms and extending in the vehicle width direction is provided. In the vehicle body 1, the torsion beam 17 is disposed on the vehicle body front side of the range extender device 40, on the vehicle body rear side with respect to the battery frame 30, and on a vehicle body upper side of a later-described lower frame member 71 of the rear subframe 50.

Figure 7:
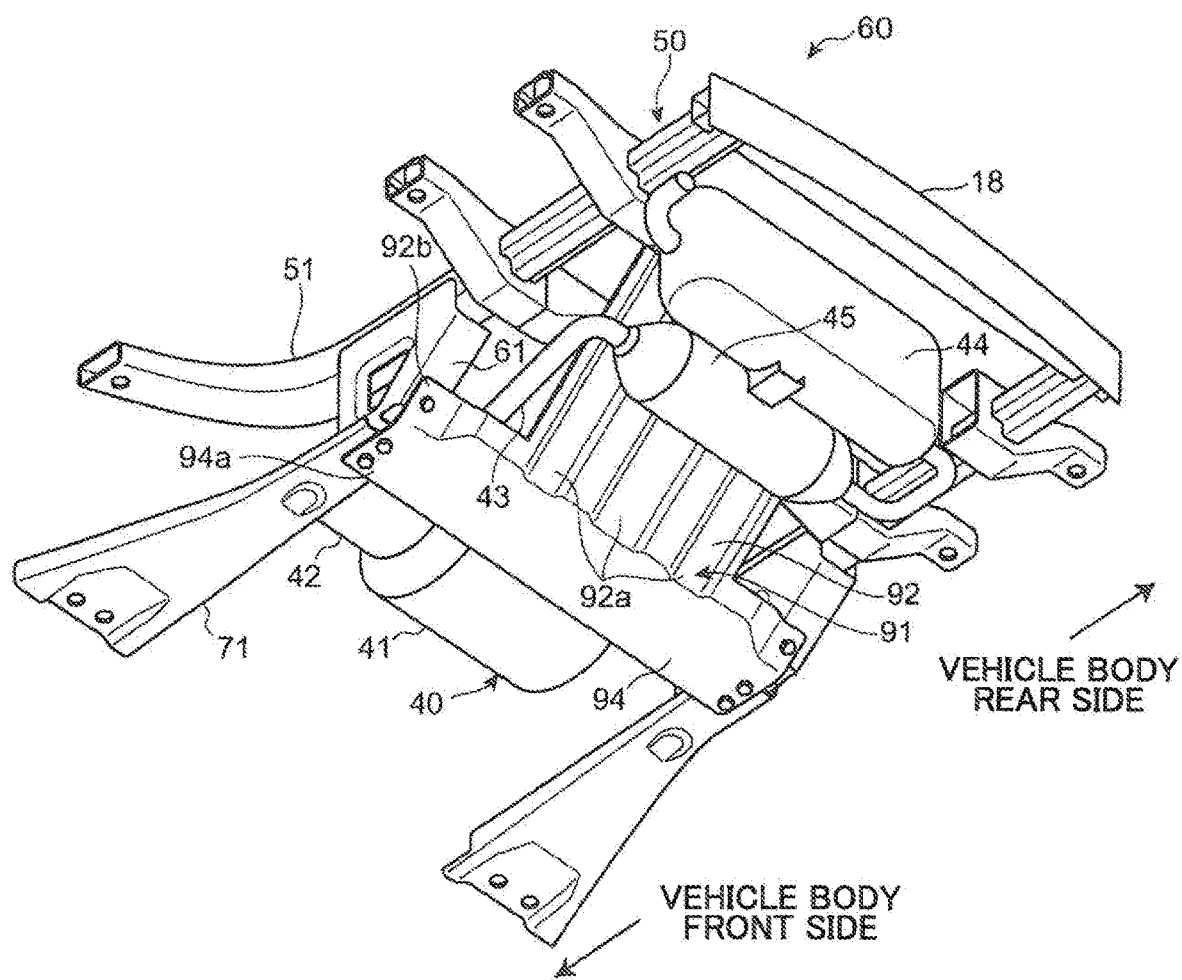
FIG. 7 is a perspective view of the subframe unit.
Figure 8:
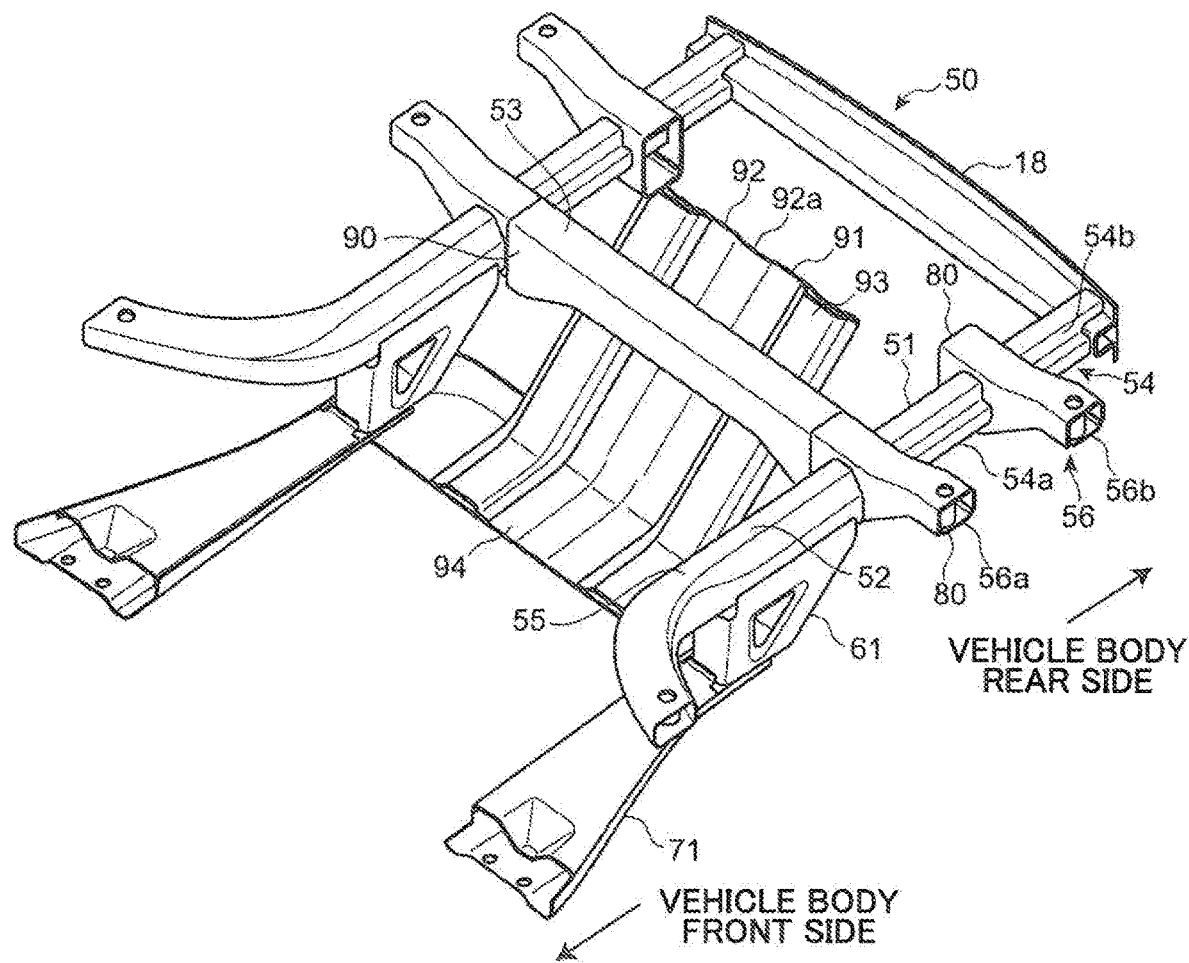
FIG. 8 is a perspective view of the subframe unit except for accessories.
Figure 9:
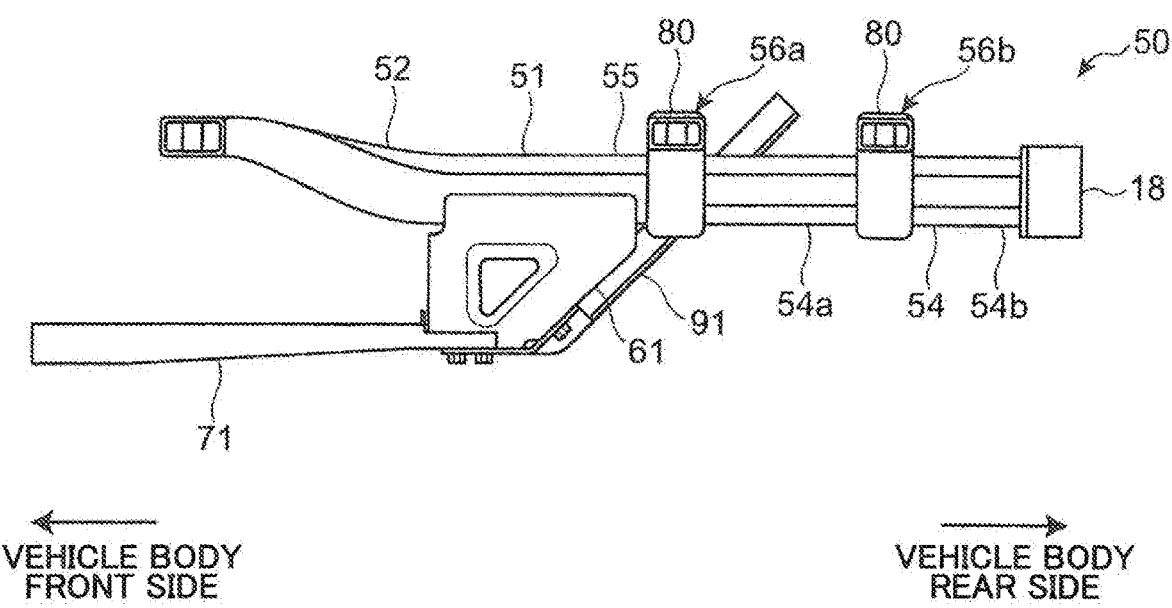
FIG. 9 is a side view of the subframe unit illustrated in FIG. 8.
Figure 10:
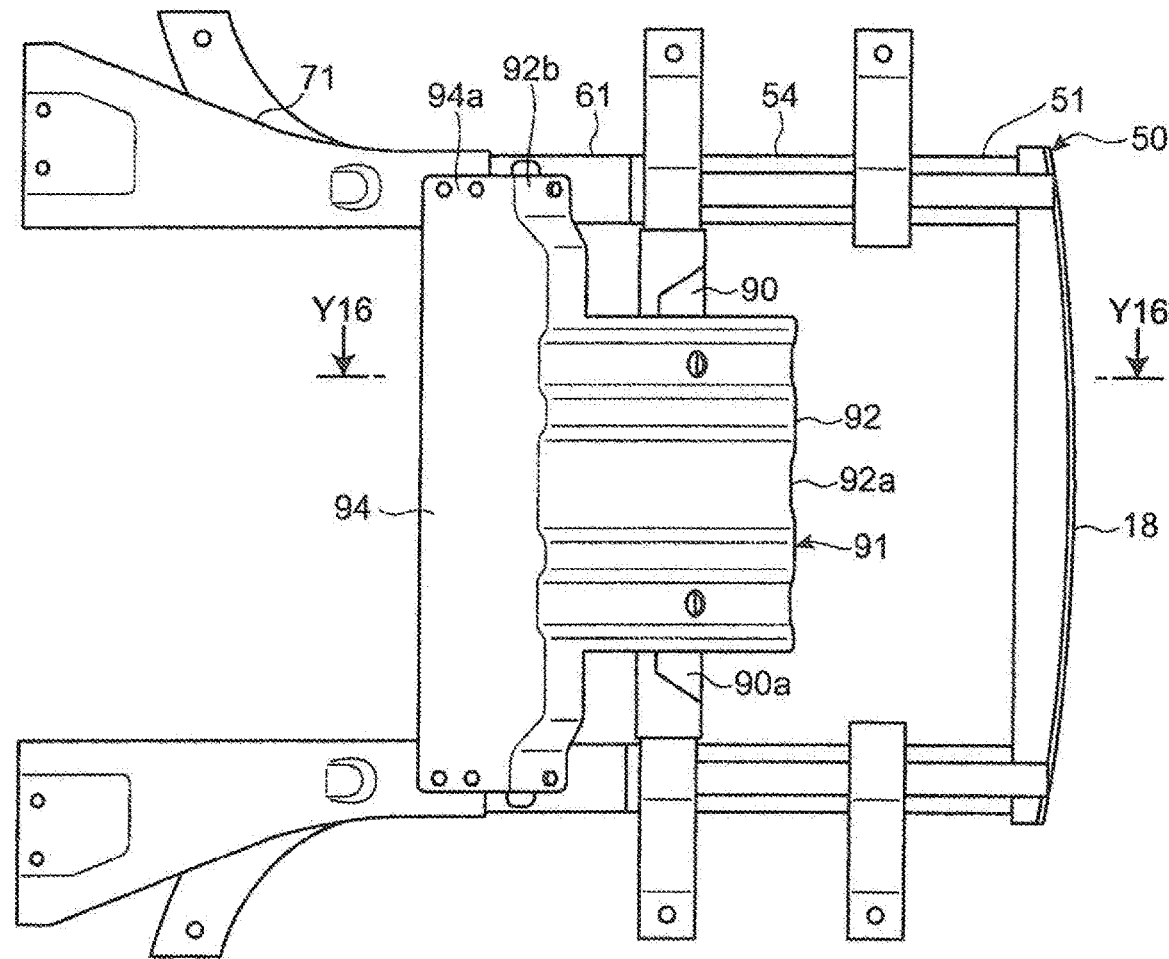
FIG. 10 is a bottom view of the subframe unit illustrated in FIG. 8.

FIG. 7 is a perspective view of the subframe unit. FIG. 8 is a perspective view of the subframe unit except for accessories. FIG. 9 is a side view of the subframe unit illustrated in FIG. 8. FIG. 10 is a bottom view of the subframe unit illustrated in FIG. 8. As illustrated in FIGS. 7 to 10, the subframe unit 60 is constituted by integrally mounting the range extender device 40, the silencer 44, and the catalytic device 45 on the rear subframe 50.

The rear subframe 50 includes: an upper frame member 51 extending in the vehicle body front-rear direction along the rear side frame 2; a branch frame member 61 joined to the upper frame member 51 and branched in such a way as to extend from a middle of the upper frame member 51 in the vehicle body front-rear direction, forwardly of the vehicle body and downwardly of the vehicle body; and the lower frame member 71 disposed on the vehicle body lower side with respect to the upper frame member 51, and extending substantially horizontally and forwardly of the vehicle body from the branch frame member 61.

A subframe bumper reinforcement 18, which is disposed within a rear bumper (not illustrated) extending in the vehicle width direction, is connected also to the rear subframe 50. Vehicle body rear ends of the left and right upper frame members 51 are respectively connected to both ends of the subframe bumper reinforcement 18. The rear subframe 50 is formed laterally symmetrical in the vehicle width direction.

The upper frame member 51 includes left and right upper frame portions 52 respectively extending in the vehicle body front-rear direction along the left and right rear side frames 2, and an upper cross portion 53 extending in the vehicle width direction and connecting the left and right upper frame portions 52 at middle portions thereof in the vehicle width direction.

The upper frame portion 52 includes a load absorbing portion 54, which is formed into a closed cross section, extends rearwardly of the vehicle body with respect to the range extender device 40, and absorbs a collision load, when the collision load is applied from rearwardly of the vehicle body to a position on the vehicle body rear side with respect to the range extender device 40.

As illustrated in FIG. 8, the load absorbing portion 54 includes a front load absorbing portion 54a disposed on the vehicle body front side, and a rear load absorbing portion 54b disposed on the vehicle body rear side with respect to the front load absorbing portion 54a. The front load absorbing portion 54a and the rear load absorbing portion 54b are formed into a same closed cross section on an orthogonal cross section substantially orthogonal to the vehicle body front-rear direction, and have a closed cross section portion of a substantially cross shape in cross section similarly to the crash can 6. The rear load absorbing portion 54b is formed to have a small thickness of steel plate and a small strength against compression in the axis direction, as compared with the front load absorbing portion 54a.

Each of the front load absorbing portion 54a and the rear load absorbing portion 54b is formed into a substantially cross shape in cross section by joining a first plate-shaped member and a second plate-shaped member, the first plate-shaped member being formed into a projection shape in cross section and projecting outwardly in the vehicle width direction, the second plate-shaped member being formed into a projection shape in cross section and projecting inwardly in the vehicle width direction. However, structures of the load absorbing portions 54a and 54b are not limited to the above.

In the vehicle body 1, the silencer 44 and the catalytic device 45 are provided on the vehicle body front side of the load absorbing portion 54 of the rear subframe 50, at a position where the silencer 44 and the catalytic device 45 overlap the load absorbing portion 54, specifically the front load absorbing portion 54a, in the vehicle body front-rear direction (see FIG. 2).

The upper frame portion 52 further includes a front frame portion 55 on the vehicle body front side with respect to the load absorbing portion 54. A vehicle body rear part of the front frame portion 55 is formed into a closed cross section of a substantially hexagonal shape in cross section, and a vehicle body front part thereof is formed into a closed cross section of a substantially rectangular shape in cross section.

As illustrated in FIG. 4, the front frame portion 55 extends outwardly in the vehicle width direction, as extending forwardly of the vehicle body, and is connected to a vehicle body front part of the rear side frame 2 using a bolt and a nut. The front frame portion 55 is formed to have a large thickness of steel plate and a large strength against compression in the axis direction, as compared with the front load absorbing portion 54a and the rear load absorbing portion 54b.

As illustrated in FIG. 2, a load absorbing portion of the side of the side frame provided on the rear side frame 2, that is, the crash can 6 (hereinafter, also referred to as a load absorbing portion 6), and the load absorbing portion 54 of the side of the subframe provided on the rear subframe 50, are provided in such a way that a rear end of the load absorbing portion 54 of the side of the subframe is disposed on the vehicle body front side with respect to a rear end of the load absorbing portion 6 of the side of the side frame, and a front end of the load absorbing portion 54 of the side of the subframe is disposed on the vehicle body front side with respect to a front end of the load absorbing portion 6 of the side of the side frame.

On the upper frame portion 52, a plurality of frame connecting portions 56 connecting the rear subframe 50 and the rear side frame 2 are also provided. The plurality of the frame connecting portions 56 are provided to be separated away from one another in the vehicle body front-rear direction. A front frame connecting portion 56a and a rear frame connecting portion 56b connecting the load absorbing portion 54 of the rear subframe 50 and the rear side frame 2 are provided in the vehicle body 1.

Figure 11:
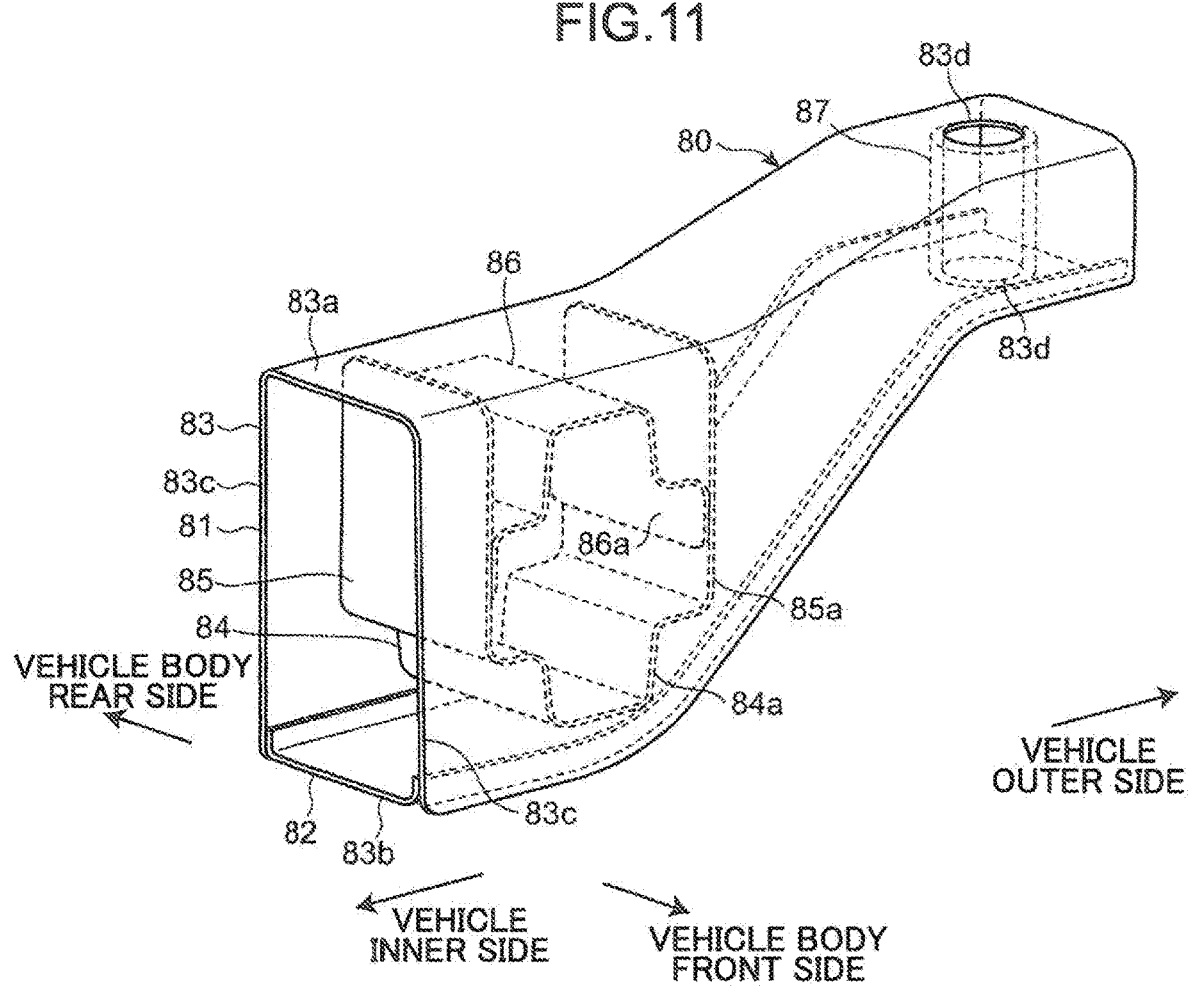
FIG. 11 is a perspective view illustrating a frame connecting portion for connecting a rear subframe and a rear side frame.

FIG. 11 is a perspective view illustrating a frame connection member connecting the rear subframe and the rear side frame, and illustrates a frame connecting member 80 constituting the rear frame connecting portion 56b. Regarding the rear frame connecting portion 56b, the rear subframe 50, and the rear side frame 2 disposed in proximity to the rear subframe 50 are connected by the frame connecting member 80.

As illustrated in FIG. 11, the frame connecting member 80 includes a peripheral wall portion 83 and a load transmitting portion 84, the peripheral wall portion 83 extending in the vehicle width direction, and being formed into a closed cross section of a substantially rectangular shape in cross section on an orthogonal cross section orthogonal to the vehicle width direction, the load transmitting portion 84 being disposed within the peripheral wall portion 83 and extending in the vehicle body front-rear direction. The peripheral wall portion 83 is constituted by joining an upper frame 81 and a lower frame 82, the upper frame 81 being formed into a substantially U-shape in cross section and constituting a vehicle body upper part of the frame connecting member 80, the lower frame 82 being formed into a substantially U-shape in cross section and constituting a vehicle body lower part of the frame connecting member 80.

The peripheral wall portion 83 includes an upper surface portion 83a, a lower surface portion 83b, and lateral surface portions 83c on both sides in the vehicle body front-rear direction. The peripheral wall portion 83 is formed into a closed cross section. The load transmitting portion 84 has a closed cross-sectional portion 84a which is formed into a substantially cross shape in cross section by joining a first plate-shaped member 85 formed into a projection shape in cross section, and a second plate-shaped member 86 formed into a projection shape in cross section.

The closed cross-sectional portion 84a of the load transmitting portion 84 is formed to have a same shape as a closed cross-sectional portion of the front load absorbing portion 54a and a closed cross-sectional portion of the rear load absorbing portion 54b of the rear subframe 50. The load transmitting portion 84 is formed in such a way that a vehicle body front part of the load transmitting portion 84 is abutted on and jointed to a vehicle body front part of the peripheral wall portion 83, and a vehicle body rear part of the load transmitting portion 84 is abutted on and jointed to a vehicle body rear part of the peripheral wall portion 83, in a state that both lateral surface portions 85a of the first plate-shaped member 85 and both lateral surface portions 86a of the second plate-shaped member 86 are joined to one another.

On the outer side of the frame connecting member 80 in the vehicle width direction, a bolt insertion hole 83d is formed in the upper surface portion 83a and the lower surface portion 83b, and a tubular member 87 of a substantially tubular shape in association with the bolt insertion hole 83d for receiving a bolt B2 is fixedly mounted on the upper surface portion 83a.

The frame connecting member 80 is disposed between the front load absorbing portion 54a and the rear load absorbing portion 54b in such a way that the closed cross-sectional portion 84a of the load transmitting portion 84 is aligned, in the vehicle body front-rear direction, with a closed cross-sectional portion of the front load absorbing portion 54a and a closed cross-sectional portion of the rear load absorbing portion 54b, and is joined and connected to the front load absorbing portion 54a and the rear load absorbing portion 54b.

Further, as illustrated in FIG. 3, the frame connecting member 80 is connected to the rear side frame 2 by screwing the bolt B2 in a nut (not illustrated) welded to a vehicle body upper part of a lower surface portion 2a of the rear side frame 2 in a state that the bolt insertion hole 83d provided in the upper surface portion 83a of the frame connecting member 80 corresponds to a bolt insertion hole 2b provided in the lower surface portion 2a of the rear side frame 2, and that the frame connecting member 80 is disposed on the vehicle body lower side of the rear side frame 2.

Also regarding the front frame connecting portion 56a, the rear subframe 50 and the rear side frame 2 are connected by a frame connecting member 80. The frame connecting member 80 includes a peripheral wall portion 83 and a load transmitting portion 84 similarly formed on the rear frame connecting portion 56b. A bolt insertion hole 83d is formed on the outer side of the frame connecting member 80 in the vehicle width direction, and a tubular member 87 is fixedly mounted on an upper surface portion 83a.

In the front frame connecting portion 56a, the frame connecting member 80 is disposed between the front load absorbing portion 54a and the front frame portion 55 in such a way that a closed cross-sectional portion 84a of the load transmitting portion 84 is aligned with a closed cross-sectional portion of the front load absorbing portion 54a in the vehicle body front-rear direction. The frame connecting member 80 is joined and connected to the front load absorbing portion 54a and the front frame portion 55.

The frame connecting member 80 of the front frame connecting portion 56a is also connected to the rear side frame 2 by screwing a bolt B2 into a nut welded on a vehicle body upper part of the lower surface portion 2a of the rear side frame 2 in a state that the bolt insertion hole 83d provided in the upper surface portion 83a of the frame connecting member 80 corresponds to the bolt insertion hole 2b provided in the lower surface portion 2a of the rear side frame 2, and that the frame connecting member 80 is disposed on the vehicle body lower side of the rear side frame 2.

The left and right frame connecting members 80 constituting the front frame connecting portion 56a are connected by a sub cross member 90 formed into a closed cross section and extending in the vehicle width direction. The upper cross portion 53 is formed by joining both ends of the sub cross member 90 in the vehicle width direction to the peripheral wall portions 83 of the left and right frame connecting members 80. In the sub cross member 90, an inclined surface 90a (see FIGS. 10 and 16), which is inclined downwardly of the vehicle body as extending forwardly of the vehicle body, is further provided on a middle portion in the vehicle width direction. A later-described guide panel (guide portion 91) is mounted on the inclined surface 90a.

Figure 12:
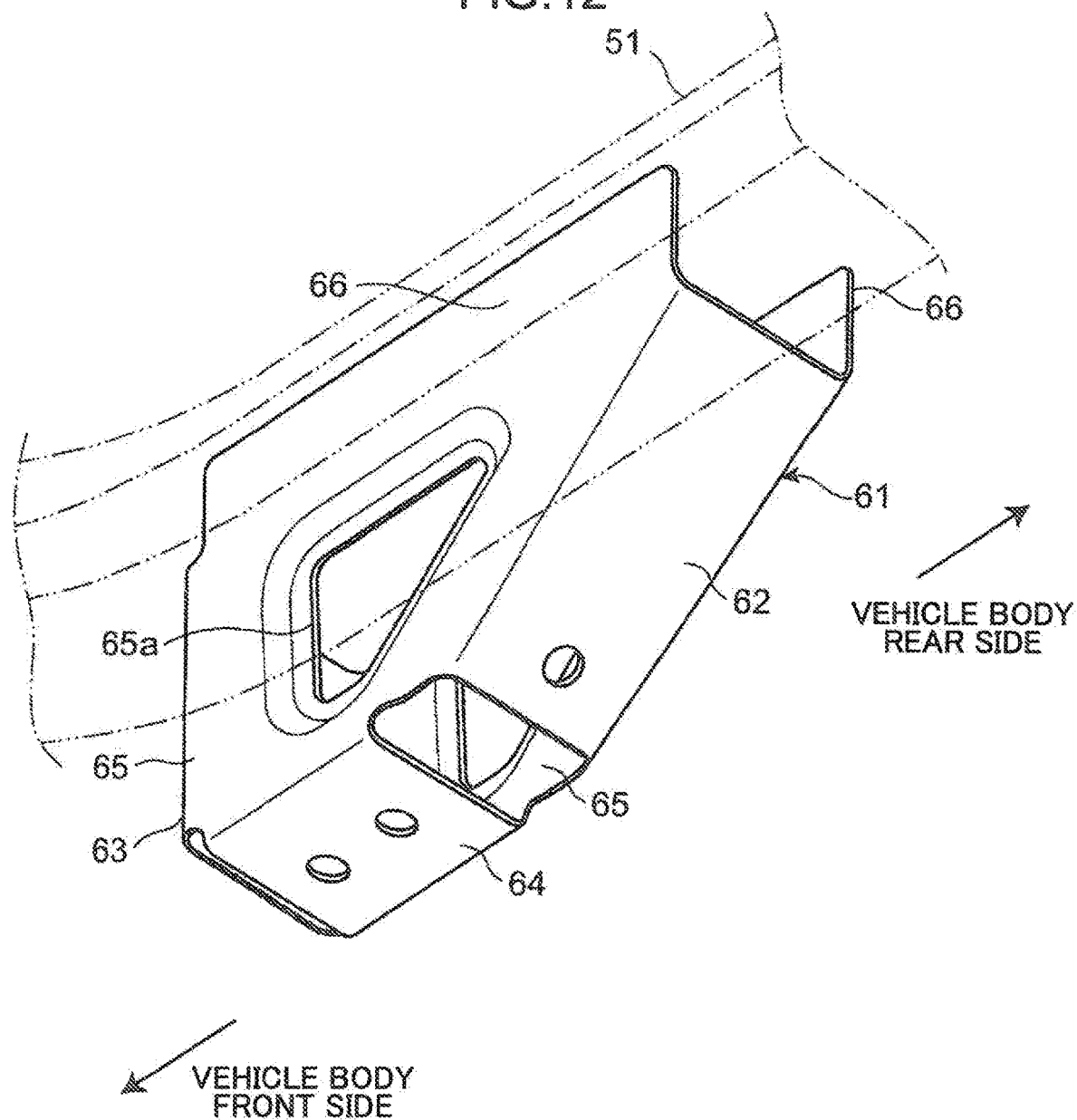
FIG. 12 is a perspective view illustrating a branch frame member of the subframe unit.

FIG. 12 is a perspective view illustrating the branch frame member of the subframe unit. As illustrated in FIG. 12, the branch frame member 61 includes: a rear surface portion 62 disposed on the vehicle body rear side and extending while being inclined downwardly of the vehicle body, as extending forwardly of the vehicle body; a front surface portion 63 disposed on the vehicle body front side and extending downwardly of the vehicle body in a substantially vertical direction; a bottom surface portion 64 disposed on the vehicle body lower side and extending in the vehicle body front-rear direction and in a substantially horizontal direction; and both side lateral surface portions 65 connecting inner ends and outer ends in the vehicle width direction of each of the rear surface portion 62, the front surface portion 63, and the bottom surface portion 64, and disposed, in a direction substantially orthogonal to the vehicle width direction, to be separated away from each other in the vehicle width direction.

The lateral surface portion 65 of the branch frame member 61 is formed into a substantially right angled trapezoidal shape in which a vehicle body upper part has a long length in the vehicle body front-rear direction, as compared with a vehicle body lower part. An opening 65a of a substantially inverted triangular shape is formed in the lateral surface portion 65. The branch frame member 61 is connected to the upper frame member 51 by joining, to the upper frame member 51, a flange portion 66 provided on both side lateral surface portions 65 and extending upwardly of the vehicle body.

Figure 13:
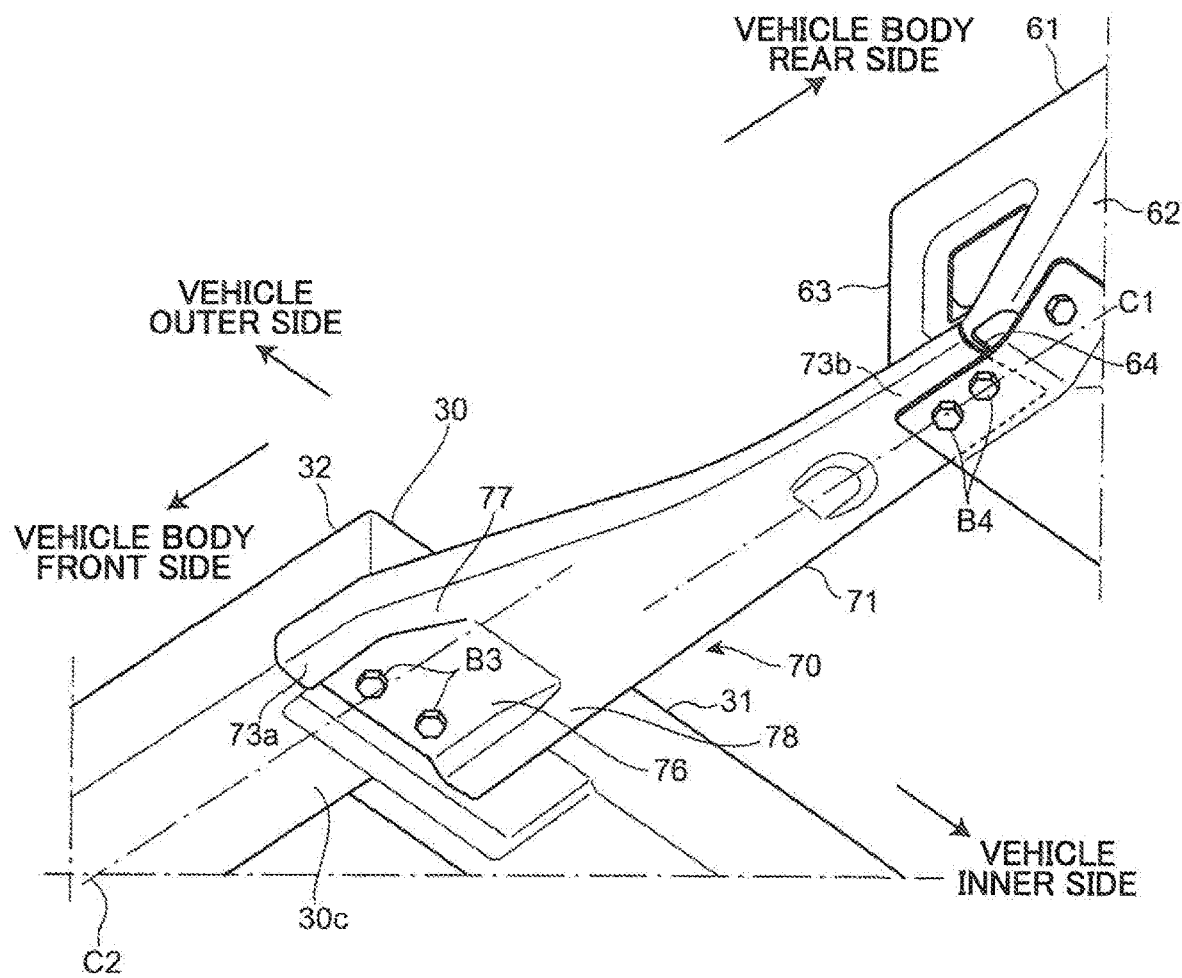
FIG. 13 is a perspective view illustrating a frame connecting portion for connecting the rear subframe and the battery frame.
Figure 14:
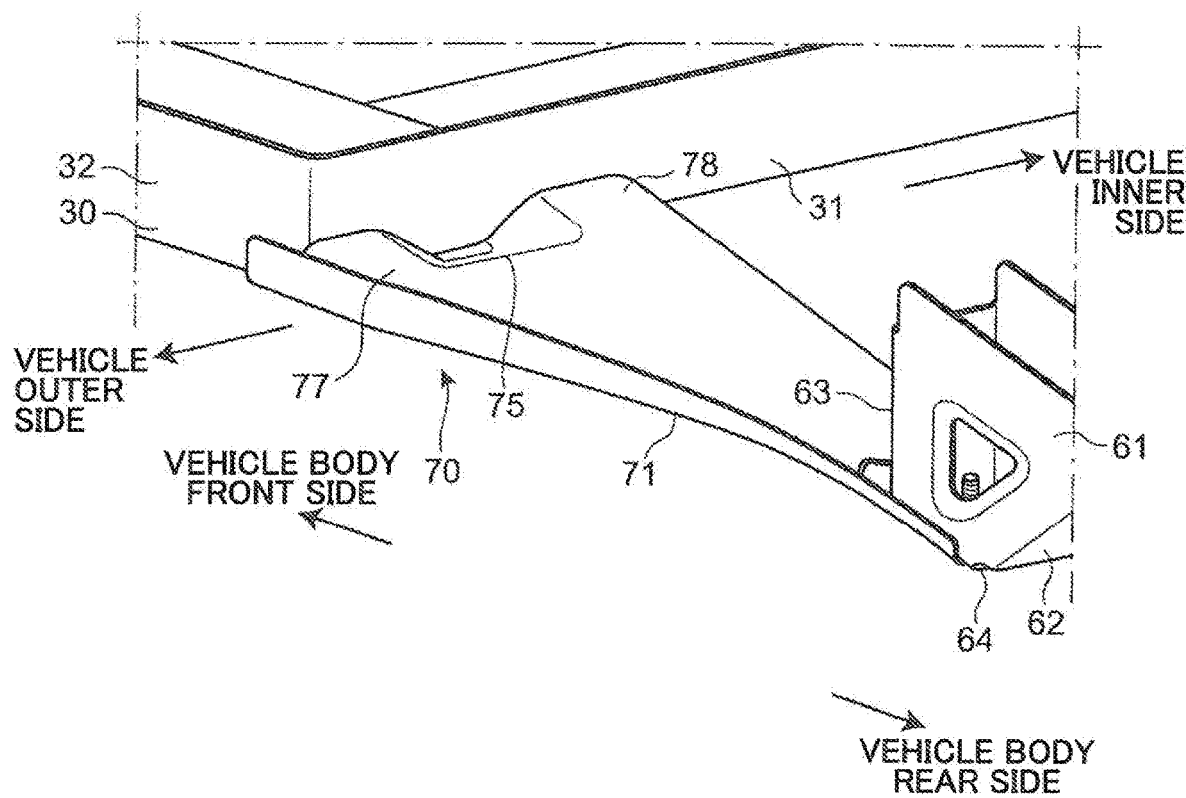
FIG. 14 is another perspective view illustrating a frame connecting portion for connecting the rear subframe and the battery frame.
Figure 15:
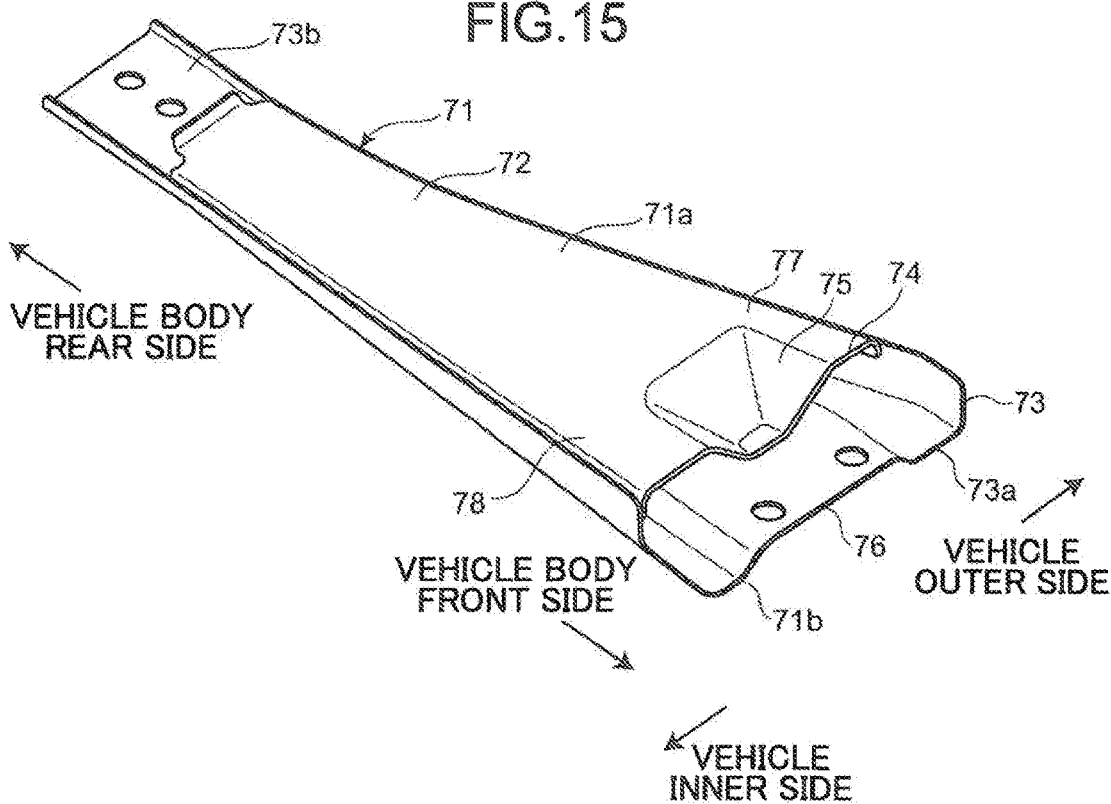
FIG. 15 is a perspective view illustrating a lower frame member of the subframe unit.

FIG. 13 is a perspective view illustrating the frame connecting portion connecting the rear subframe and the battery frame. FIG. 14 is another perspective view illustrating the frame connecting portion connecting the rear subframe and the battery frame. FIG. 15 is a perspective view illustrating the lower frame member of the subframe unit.

As illustrated in FIGS. 13 to 15, in a frame connecting portion 70 connecting the rear subframe 50 and the battery frame 30, the lower frame member 71 of the rear subframe 50 and the battery frame 30 are connected. The lower frame member 71 includes a closed cross-sectional portion 74, which is formed into a closed cross section on an orthogonal cross section orthogonal to the vehicle body front-rear direction, by joining an upper frame 72 of a substantially U-shape in cross section, constituting a vehicle body upper part of the lower frame member 71, and a lower frame 73 of a substantially U-shape in cross section, constituting a vehicle body lower part of the lower frame member 71.

An inner portion in the vehicle width direction of the lower frame member 71 is linearly formed in the vehicle body front-rear direction, and an outer portion in the vehicle width direction of the lower frame member 71 extends inclined outwardly in the vehicle width direction, as extending forwardly of the vehicle body. In other words, the lower frame member 71 has a substantially right angled triangular shape in which a width of a vehicle body front part in the vehicle width direction is large, as compared with that of a vehicle body rear part in a plan view.

As illustrated in FIG. 15, a first recess portion 75 is formed in a middle portion in the vehicle width direction in a vehicle body front end of an upper surface portion 71a of the lower frame member 71, the first recess portion 75 being recessed in a shape of a substantially frustum of a quadrilateral pyramid, in such a way that a ridge line extending in the vehicle body front-rear direction is formed on an inner portion of the closed cross-sectional portion 74. A second recess portion 76 is formed in a middle portion in the vehicle width direction in a vehicle body front end of a lower surface portion 71b, the second recess portion 76 being recessed in a shape of a substantially quadratic prism, in such a way that a ridge line extending in the vehicle body front-rear direction is formed on an inner portion of the closed cross-sectional portion 74.

A front extension portion 73a and a rear extension portion 73b respectively extending forwardly of the vehicle body and rearwardly of the vehicle body with respect to the upper frame 72 are provided on the lower frame 73 of the lower frame member 71.

The lower frame member 71 is connected to the battery frame 30 by a nut (not illustrated) fixedly attached to an upper surface of a bottom surface portion 30c of the battery frame 30 and a bolt B3 to be screwed in the nut, in a state that a vehicle body front part of the closed cross-sectional portion 74 is disposed to face the battery frame 30, and that the front extension portion 73a is overlapped on the bottom surface portion 30c of the battery frame 30. A lower frame of the rear frame 31 extends in such a way as to cover the lateral frame 32, on the vehicle body rear side of the lateral frame 32 of the battery frame 30.

As illustrated in FIGS. 1 and 13, the lateral frame 32 of the battery frame 30 extends in the vehicle body front-rear direction, while being offset to a middle side in the vehicle body front-rear direction with respect to the rear subframe 50, and being offset outwardly in the vehicle width direction with respect to the rear subframe 50.

Specifically, the lateral frame 32 extends in the vehicle body front-rear direction in such a way that a centerline C2 of the lateral frame 32 is offset outwardly in the vehicle width direction with respect to a centerline C1 of the rear subframe 50 in the vehicle width direction (in other words, a line passing through a center of the load absorbing portion 54 in the vehicle width direction, and extending in the vehicle body front-rear direction).

The lower frame member 71 includes: an inclined portion 77 extending while being inclined outwardly in the vehicle width direction, as extending forwardly of the vehicle body, to face the lateral frame 32; and a widening portion 78 widening inwardly in the vehicle width direction from the inclined portion 77 up to a position where the lower frame member 71 linearly extends in the vehicle body front-rear direction, and facing the rear frame 31.

The inclined portion 77 is formed by an outer portion of the lower frame member 71 in the vehicle width direction.

The widening portion 78 is formed by an inner portion of the lower frame member 71 in the vehicle width direction on the vehicle body front side. A vehicle body rear part of the lower frame member 71 has a width substantially equal to a width of the upper frame member 51 and the branch frame member 61 in the vehicle width direction.

The lower frame member 71 is further connected to the branch frame member 61 by a nut (not illustrated) fixedly attached to an upper surface of the bottom surface portion 64 of the branch frame member 61 and a bolt B4 to be screwed in the nut, in a state that a vehicle body rear part of the closed cross-sectional portion 74 is disposed facing the front surface portion 63 of the branch frame member 61, and that the rear extension portion 73b is overlapped with the bottom surface portion 64 of the branch frame member 61.

Figure 16:
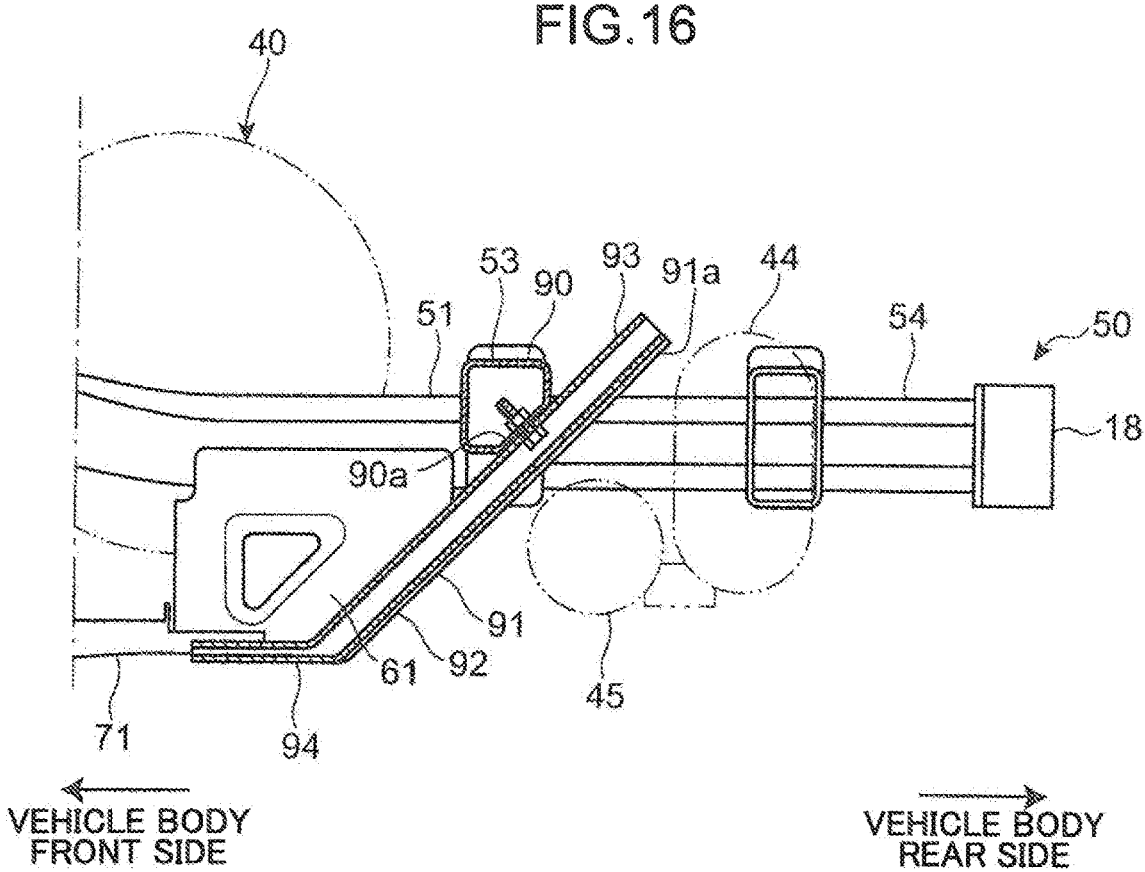
FIG. 16 is a cross-sectional view of a rear subframe unit taken along the line Y16-Y16 in FIG. 10.

FIG. 16 is a cross-sectional view of the subframe unit taken along the line Y16-Y16 in FIG. 10. As illustrated in FIG. 16, the rear subframe 50 includes a guide portion 91, which is disposed on the vehicle body rear side with respect to the range extender device 40, and on the vehicle body front side with respect to the silencer 44 and the catalytic device 45. The guide portion 91 is constituted of a guide panel which extends while being inclined downwardly of the vehicle body, as extending forwardly of the vehicle body, and is configured to guide the silencer 44 when a collision load is applied from rearwardly of the vehicle body.

The guide portion 91 includes a vertical wall portion 92 extending while being inclined downwardly of the vehicle body, as extending forwardly of the vehicle body. The guide portion 91 extends downwardly of the vehicle body with respect to the range extender device 40 in such a way as to cover the range extender device 40 from the vehicle body rear side. A plurality of recess portions 92a, specifically, three recess portions 92a are provided in the vertical wall portion 92 to be separated away from one another in the vehicle width direction. Each of the recess portions 92a extends vertically of the vehicle body, and is recessed forwardly of the vehicle body. Thus, a plurality of ridge lines extending vertically of the vehicle body are formed on the guide portion 91 by the recess portions 92a.

As illustrated in FIG. 8, a mounting bracket 93 of a substantially hat shape in cross section is mounted on both sides, in the vehicle width direction, of a vehicle body front part of the guide portion 91, in such a way as to cover a vehicle body front part of the recess portion 92a. As illustrated in FIG. 16, the mounting bracket 93 is mounted on the inclined surface 90a of the sub cross member 90 using a bolt and a nut. Thus, the guide portion 91 is connected to the upper cross portion 53. The guide portion 91 extends rearwardly of the vehicle body with respect to the upper cross portion 53. A portion 91a extending rearwardly of the vehicle body with respect to the upper cross portion 53 is supported on the upper cross portion 53 in a cantilever state.

The guide portion 91 further includes a bottom surface portion 94 extending forwardly of the vehicle body from a vehicle body lower part of the vertical wall portion 92. Flange portions 94a provided on both sides, in the vehicle width direction, of the bottom surface portion 94 are connected to the bottom surface portion 64 of the branch frame member 61 together with the rear extension portion 73b of the lower frame member 71 using a bolt B4 and a nut. Flange portions 92b provided on both sides, in the vehicle width direction, of a vehicle body lower part of the vertical wall portion 92 are connected to the rear surface portion 62 of the branch frame member 61 using a bolt B5 and a nut (see FIGS. 10 and 13).

The guide portion 91 is connected to a front end of the load absorbing portion 54 provided on the upper frame member 51 via the upper cross portion 53, and is connected to the bottom surface portion 64 of the branch frame member 61 and the rear extension portion 73b of the lower frame member 71. It is also possible to use the bottom surface portion 94 of the guide portion 91 as a jack contact portion where a garage jack comes into contact at maintenance work or the like, for example.

Figure 17:
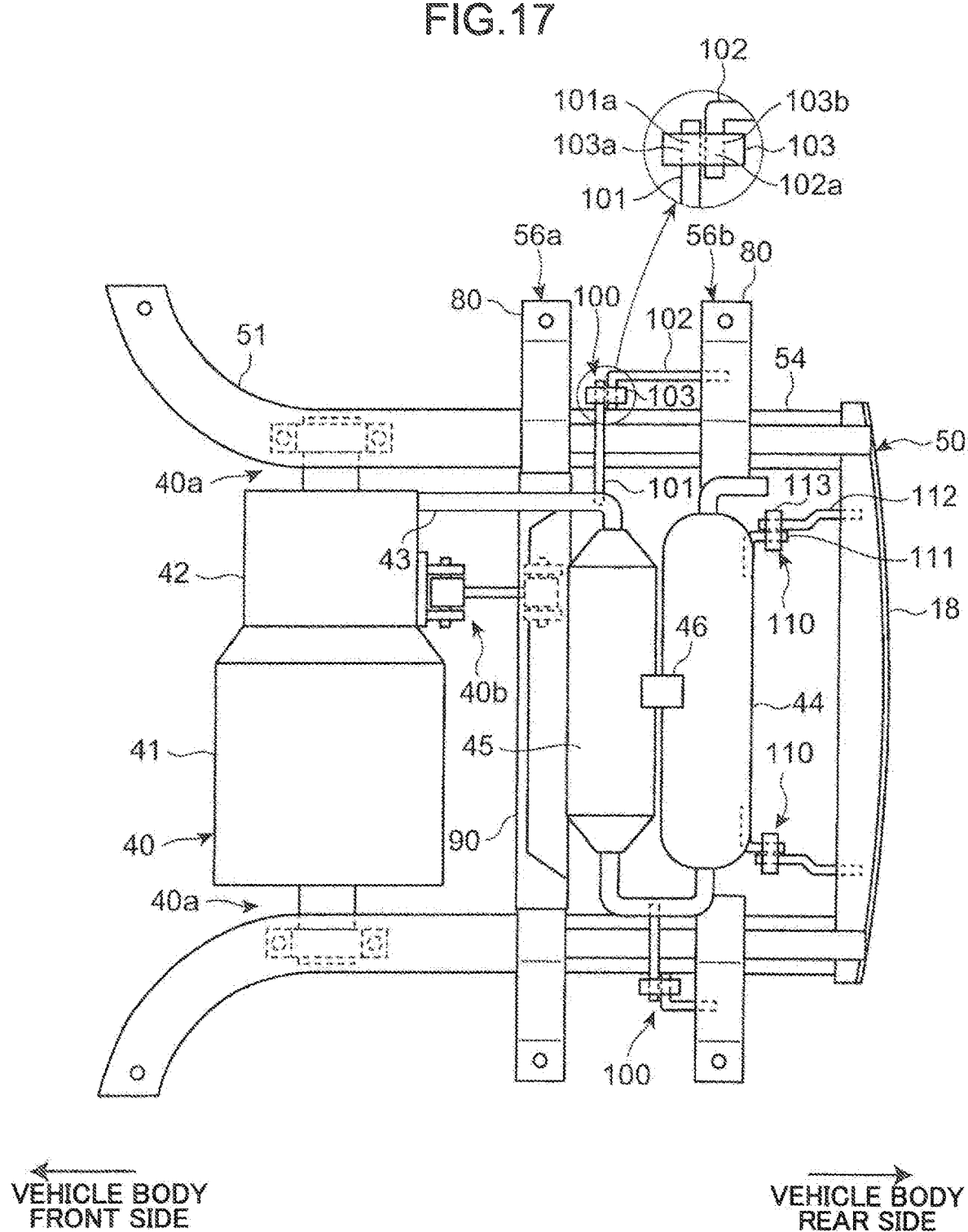
FIG. 17 is an explanatory diagram illustrating how an accessory is mounted on the rear subframe.
Figure 18:
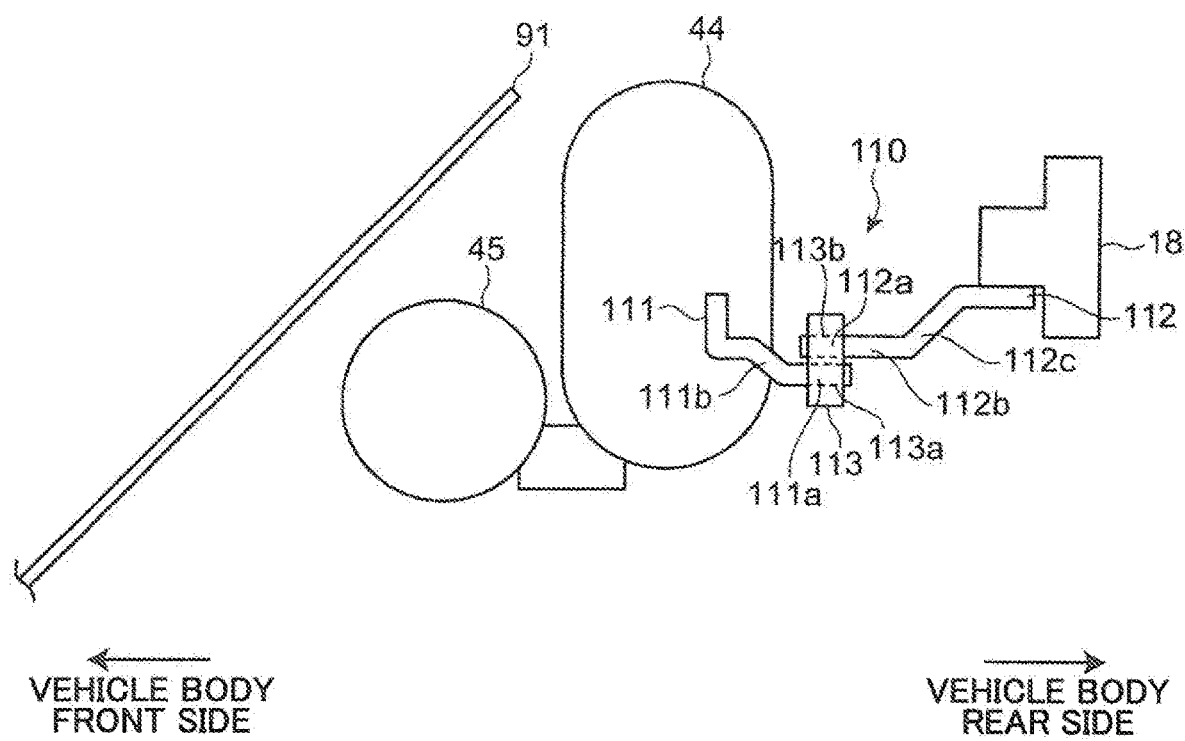
FIG. 18 is an explanatory diagram illustrating a rear support hanger for supporting a silencer.

FIG. 17 is an explanatory diagram illustrating how an accessory is mounted on the rear subframe, and illustrates a portion associated with mounting an accessory. In the drawings except for FIGS. 17 to 19, illustration of a mounting structure of an accessory on the rear subframe 50 is omitted. As illustrated in FIG. 17, the range extender device 40 is mounted on the upper frame member 51 of the rear subframe 50 via an elastic member by left and right lateral support portions 40a provided on both sides in the vehicle width direction, and is mounted on the sub cross member 90 via an elastic member by a rear support portion 40b provided on the vehicle body rear side.

The silencer 44 and the catalytic device 45 are mounted on the rear subframe 50 by a front support hanger 100, and a rear support hanger 110 disposed on the vehicle body rear side with respect to the front support hanger 100.

The front support hanger 100 includes: a silencer rod 101, which is fixed to both sides, in the vehicle width direction, of the exhaust pipe 43 on the upstream side with respect to the silencer 44, and a distal end of which extends in the vehicle width direction; a subframe rod 102, which is fixed to the frame connecting member 80 of the rear frame connecting portion 56b of the rear subframe 50, and a distal end of which extends in the vehicle width direction; and a rubber member 103 as an elastic body into which the silencer rod 101 and the subframe rod 102 are inserted.

The rubber member 103 has a substantially elliptical plate shape and is made of an elastic material such as rubber. Insertion holes 103a and 103b, which extend in the axis direction of the rubber member 103, and into which the silencer rod 101 and the subframe rod 102 are respectively inserted, are provided in the rubber member 103. The two insertion holes 103a and 103b are provided in the rubber member 103 of the front support hanger 100 in such a way as to extend in the vehicle width direction while being separated away from each other in the vehicle body front-rear direction.

The silencer rod 101 includes, at a distal end thereof, a silencer insertion portion 101a extending in the vehicle width direction, and configured to be inserted into the insertion hole 103a of the rubber member 103. The subframe rod 102 includes, at a distal end thereof, a subframe insertion portion 102a extending in the vehicle width direction, and configured to be inserted into the insertion hole 103b of the rubber member 103.

The front support hanger 100 is configured in such a way that the silencer insertion portion 101a of the silencer rod 101 and the subframe insertion portion 102a of the subframe rod 102 are respectively inserted into the insertion holes 103a and 103b of the rubber member 103, and that the silencer 44 and the catalytic device 45 are supported on the rear subframe 50 via the rubber member 103.

FIG. 18 is an explanatory diagram illustrating the rear support hanger supporting the silencer, and schematically illustrates a portion associated with the rear support hanger. As illustrated in FIGS. 17 and 18, the rear support hanger 110 is provided on each side, in the vehicle width direction, of a vehicle body rear part of the silencer 44. The rear support hanger 110 includes: a silencer rod 111, which is fixed to the silencer 44 and a distal end of which extends in the vehicle body front-rear direction; a subframe rod 112, which is fixed to the subframe bumper reinforcement 18 of the rear subframe 50, and a distal end of which extends in the vehicle body front-rear direction; and a rubber member 113 as an elastic body into which the silencer rod 111 and the subframe rod 112 are inserted.

The rubber member 113 has a substantially elliptical plate shape and is made of an elastic material such as rubber. Insertion holes 113a and 113b, which extend in the axis direction of the rubber member 113, and into which the silencer rod 111 and the subframe rod 112 are respectively inserted, are provided in the rubber member 113. The two insertion holes 113a and 113b are provided in the rubber member 113 of the rear support hanger 110 in such a way as to extend in the vehicle body front-rear direction, while being separated away from each other vertically of the vehicle body and in the vehicle width direction.

The silencer rod 111 includes, at a distal end thereof, a silencer insertion portion 111a extending in the vehicle body front-rear direction, and configured to be inserted into the insertion hole 113a of the rubber member 113. The silencer rod 111 further includes an elastic body movement restraining portion 111b, which is disposed on forwardly of the vehicle body with respect to the silencer insertion portion 111a, is bent, and is configured to restrain the rubber member 113 from moving forwardly of the vehicle body with respect to the silencer insertion portion 111a.

The subframe rod 112 includes, at a distal end thereof, a subframe insertion portion 112a extending in the vehicle body front-rear direction, and configured to be inserted into the insertion hole 113b of the rubber member 113. The subframe rod 112 further includes a subframe insertion allowing portion 112b, which extends straightforwardly by a predetermined distance in the vehicle body front-rear direction continued from the subframe insertion portion 112a toward a vehicle body rear part, to allow the subframe insertion portion 112a to insert into the insertion hole 113b.

The subframe rod 112 further includes an elastic body insertion restraining portion 112c, which is bent on the vehicle body rear part of the subframe insertion allowing portion 112b, to restrain a portion of a vehicle body rear side with respect to the subframe insertion allowing portion 112b from being inserted into the rubber member 113.

The rear support hanger 110 is configured in such a way that the silencer insertion portion 111a of the silencer rod 111 and the subframe insertion portion 112a of the subframe rod 112 are respectively inserted into the insertion holes 113a and 113b of the rubber member 113, and that the silencer 44 is supported on the rear subframe 50 via the rubber member 113.

FIG. 19 is an explanatory diagram illustrating how the silencer moves in rear collision. As illustrated in the section (a) of FIG. 19, in a case where a collision load is applied from rearwardly of the vehicle body in rear collision of the vehicle body 1, the collision load is input to the rear side frame 2 by deformation of the vehicle body rear part, and the collision load is also input to the rear subframe 50.

When the collision load is input to the rear subframe 50, as illustrated in the section (b) of FIG. 19, the subframe bumper reinforcement 18 of the rear subframe 50 is moved forwardly of the vehicle body, and the rear load absorbing portion 54b of the rear subframe 50 provokes a buckling distortion in the vehicle body front-rear direction, so that the collision load is absorbed.

When the subframe bumper reinforcement 18 of the rear subframe 50 is moved forwardly of the vehicle body, the subframe insertion allowing portion 112b provided on the subframe rod 112 of the rear support hanger 110 is moved forwardly of the vehicle body, and is inserted into the insertion hole 113b of the rubber member 113. Thus, the rear load absorbing portion 54b of the rear subframe 50 absorbs the collision load, without moving the silencer rod 111 of the rear support hanger 110.

As illustrated in the section (c) of FIG. 19, when the subframe bumper reinforcement 18 of the rear subframe 50 is further moved forwardly of the vehicle body, the front load absorbing portion 54a of the rear subframe 50 provokes a buckling distortion in the vehicle body front-rear direction, to absorb the collision load. In addition, the silencer 44 and the catalytic device 45 are moved forwardly of the vehicle body. However, the silencer 44 and the catalytic device 45 are moved downwardly of the vehicle body along the guide portion 91, as being moved forwardly of the vehicle body.

When the subframe bumper reinforcement 18 is further moved forwardly of the vehicle body, the subframe rod 112 is restrained from being inserted into the rubber member 113 by the elastic body insertion restraining portion 112c provided on the subframe rod 112 of the rear support hanger 110, and the rubber member 113 is restrained from moving forwardly of the vehicle body by the elastic body movement restraining portion 111b provided on the silencer rod 111 of the rear support hanger 110. Thus, the silencer 44 and the catalytic device 45 are moved downwardly of the vehicle body along the guide portion 91, as moving forwardly of the vehicle body, and the silencer rod 111 of the rear support hanger 110 is detached from the rubber member 113.

In the vehicle body 1 configured as described above, in a case where a collision load is applied from rearwardly of the vehicle body in rear collision, when the collision load is input to the rear side frame 2, the collision load is absorbed by the load absorbing portion 6 provided on the rear side frame 2, and the load input to the rear side frame 2 is transmitted and dispersed to a vehicle body front part of the rear side frame 2.

Furthermore, after the load absorbing portion 6 provided on the rear side frame 2 starts buckling distortion, the collision load is also input to the rear subframe 50, the load absorbing portion 54 provided on the rear subframe 50 provokes buckling distortion to absorb the collision load. In the rear subframe 50, after the rear load absorbing portion 54b provokes buckling distortion, the front load absorbing portion 54a provokes buckling distortion to absorb the collision load.

The load input to the rear subframe 50 is transmitted from the upper frame member 51 of the rear subframe 50 to the vehicle body front side, transmitted to the rear side frame 2 connected to a vehicle body front part of the rear subframe 50, and transmitted to the vehicle body front side; and is transmitted from the upper frame member 51 of the rear subframe 50 to the lower frame member 71 via the branch frame member 61, and transmitted from the lower frame member 71 to the battery frame 30. In this case, the load input to the branch frame member 61 is mainly transmitted to the lower frame member 71 from the rear surface portion 62 and the lateral surface portions 65 in the vicinity of both sides thereof via the bottom surface portion 64 and the lateral surface portions 65 in the vicinity of both sides thereof.

The load input to the rear subframe 50 is also transmitted to the rear surface portion 62 and the lateral surface portions 65 in the vicinity of both sides thereof of the branch frame member 61 via the upper cross portion 53 and the guide portion 91, transmitted to the lower frame member 71, and transmitted from the lower frame member 71 to the battery frame 30.

Furthermore, when a collision load is applied from rearwardly of the vehicle body to the guide portion 91 in rear collision, the collision load input to the guide portion 91 is transmitted to the rear surface portion 62 and the lateral surface portions 65 in the vicinity of both sides thereof of the branch frame member 61, transmitted to the lower frame member 71, and transmitted from the lower frame member 71 to the battery frame 30; and is transmitted from the upper cross portion 53 to the upper frame member 51 of the rear subframe 50, and transmitted to each part of the rear subframe 50.

In the vehicle body 1 according to the present embodiment, as illustrated in FIG. 2, the rear subframe 50 disposed below the rear side frame 2 includes the front load absorbing portion 54a and the rear load absorbing portion 54b which extend rearwardly of the vehicle body with respect to an important safety related component, that is, the range extender device 40 (hereinafter, referred to as an important safety related component 40), disposed on the vehicle body rear part, and are disposed on the vehicle body rear side with respect to the important safety related component 40. Strength of the rear load absorbing portion 54b against compression in the axis direction is set low, as compared with that of the front load absorbing portion 54a.

As illustrated in FIG. 8, the rear subframe 50 includes the rear frame connecting portion 56b which is disposed between the front load absorbing portion 54a and the rear load absorbing portion 54b, is connected to the front load absorbing portion 54a and the rear load absorbing portion 54b, and is connected to the rear side frame 2. The rear frame connecting portion 56b is constituted by the frame connecting member 80.

In this way, in the vehicle body rear part structure for a vehicle according to the present embodiment, the rear subframe 50 disposed below the rear side frame 2 includes the front load absorbing portion 54a and the rear load absorbing portion 54b extending rearwardly of the vehicle body with respect to the important safety related component 40 disposed on the vehicle body rear part, and disposed on the vehicle body rear side with respect to the important safety related component 40. Strength of the rear load absorbing portion 54b against compression in the axis direction is set low, as compared with that of the front load absorbing portion 54a.

With this configuration, in the rear subframe 50, the front load absorbing portion 54a provokes buckling distortion, after the rear load absorbing portion 54b away from the important safety related component 40 provokes buckling distortion in rear collision. Therefore, the collision load is absorbed by the rear load absorbing portion 54b and the front load absorbing portion 54a of the rear subframe 50 in this order in rear collision, and it is possible to protect the important safety related component 40 disposed on the vehicle body rear part by the rear subframe 50. Furthermore, the collision load is absorbed by the rear load absorbing portion 54b and the front load absorbing portion 54a of the rear subframe 50 in this order in rear collision, and it is possible to improve safety of a passenger within a passenger compartment by the rear subframe 50.

In addition, the rear subframe 50 includes the rear frame connecting portion 56b which is disposed between the front load absorbing portion 54a and the rear load absorbing portion 54b, is connected to the front load absorbing portion 54a and the rear load absorbing portion 54b, and is connected to the rear side frame 2. With this configuration, the front load absorbing portion 54a and the rear load absorbing portion 54b are connected to the rear frame connecting portion 56b connected to the rear side frame 2. Thus, bending rigidity can be increased, as compared with a case where the front load absorbing portion 54a and the rear load absorbing portion 54b are integrally formed. Hence, it is possible to effectively cause the rear load absorbing portion 54b and the front load absorbing portion 54a to provoke buckling distortion in rear collision.

Furthermore, the rear frame connecting portion 56b includes the load transmitting portion 84 extending in the vehicle body front-rear direction. The load transmitting portion 84 is formed to have a same closed cross section shape as a closed cross-sectional portion of the front load absorbing portion 54a and a closed cross-sectional portion of the rear load absorbing portion 54b. With this configuration, it is possible to effectively transmit the collision load from the rear load absorbing portion 54b to the front load absorbing portion 54a in rear collision. In addition, it is possible to increase bending rigidity, as compared with a case where the load transmitting portion 84 is formed to have a cross section shape different from a closed cross-sectional portion of the front load absorbing portion 54a and a closed cross-sectional portion of the rear load absorbing portion 54b, and to effectively cause the rear load absorbing portion 54b and the front load absorbing portion 54a to provoke buckling distortion in rear collision.

Furthermore, a closed cross-sectional portion of the front load absorbing portion 54a, a closed cross-sectional portion of the rear load absorbing portion 54b, and the load transmitting portion 84 of the rear frame connecting portion 56b are formed into a polygonal shape in cross section having sides of a number larger than the number of sides of a rectangular shape in cross section. With this configuration, it is possible to increase strength against compression in the axis direction by increasing the number of ridge lines, as compared with a case where the above-described portions are formed into a rectangular shape in cross section, and it is possible to more effectively acquire the above-described advantageous effects.

Moreover, if it is assumed that the load transmitting portion 84 is joined to the peripheral wall portion 83 by a flange portion provided on each of an end of a vehicle body front side of the load transmitting portion 84 and an end of a vehicle body rear side of the load transmitting portion 84, stress may be concentratedly applied to a portion other than the flange portions of the end of the vehicle body front side and the end of the vehicle body rear side of the load transmitting portion 84 in rear collision, to cause deformation, which may makes it impossible to effectively absorb the collision load. However, according to the above embodiment, since a vehicle body front side of the load transmitting portion 84 is abutted on and joined to a vehicle body front side of the peripheral wall portion 83, and a vehicle body rear side of the load transmitting portion 84 is abutted on and jointed to a vehicle body rear side of the peripheral wall portion 83, it is possible to suppress concentration of stress, and to effectively absorb the collision load by the front load absorbing portion 54a and the rear load absorbing portion 54b in rear collision.

In addition, the accessories 44 and 45 except for the important safety related component 40 are disposed at a position where the accessories 44 and 45 overlap the front load absorbing portion 54a in the vehicle body front-rear direction. With this configuration, it is possible to protect the important safety related component 40 in rear collision, and to prevent damage of the accessories 44 and 45 disposed at a position where the accessories 44 and 45 overlap the front load absorbing portion 54a in the vehicle body front-rear direction, when only the rear load absorbing portion 54b provokes buckling distortion.

Next, a vehicle body rear part structure for a vehicle according to a second embodiment of the present invention is described.

Figure 20:
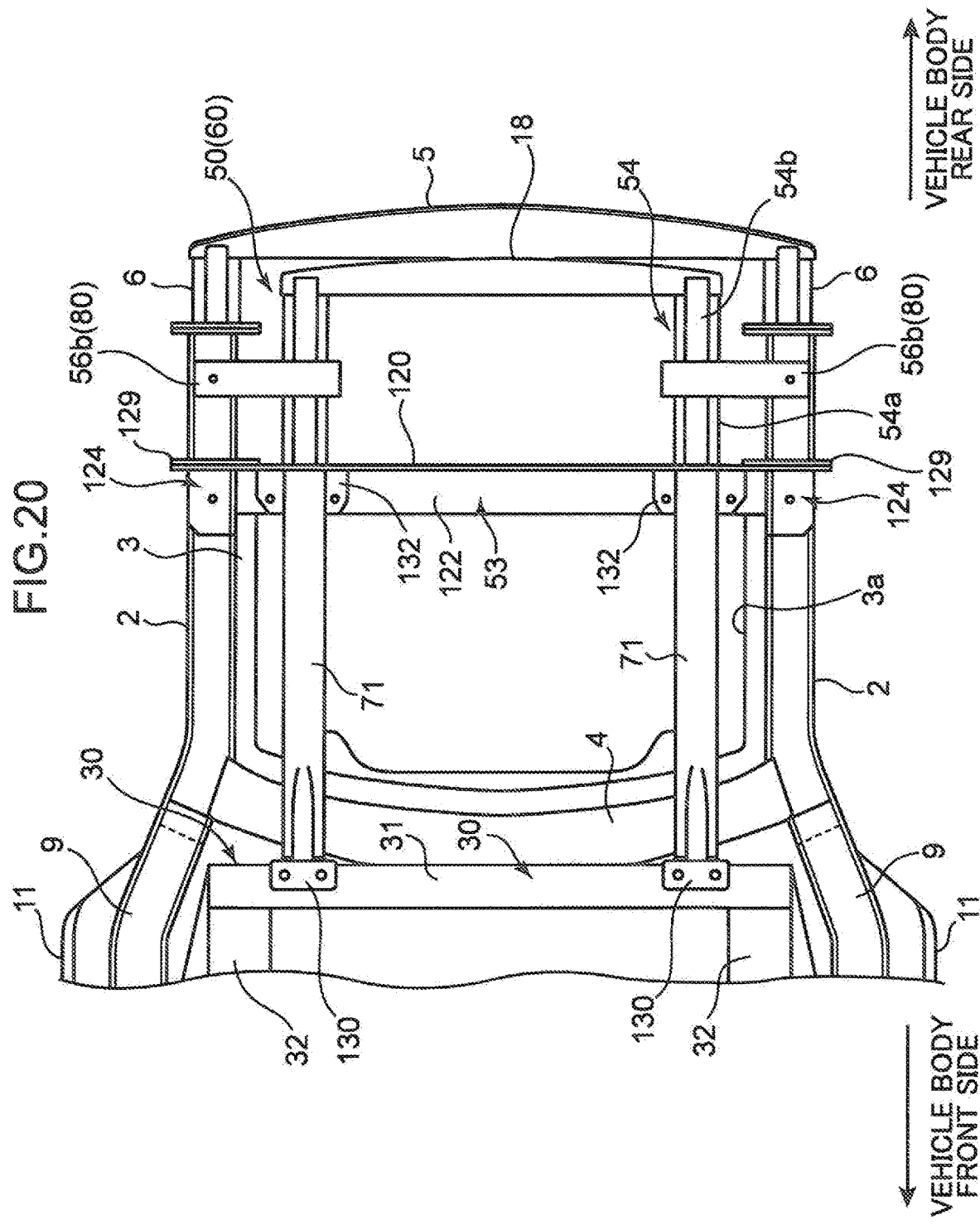
FIG. 20 is a bottom view of a vehicle body to which a vehicle body rear part structure for a vehicle according to a second embodiment of the present invention is applied.
Figure 21:
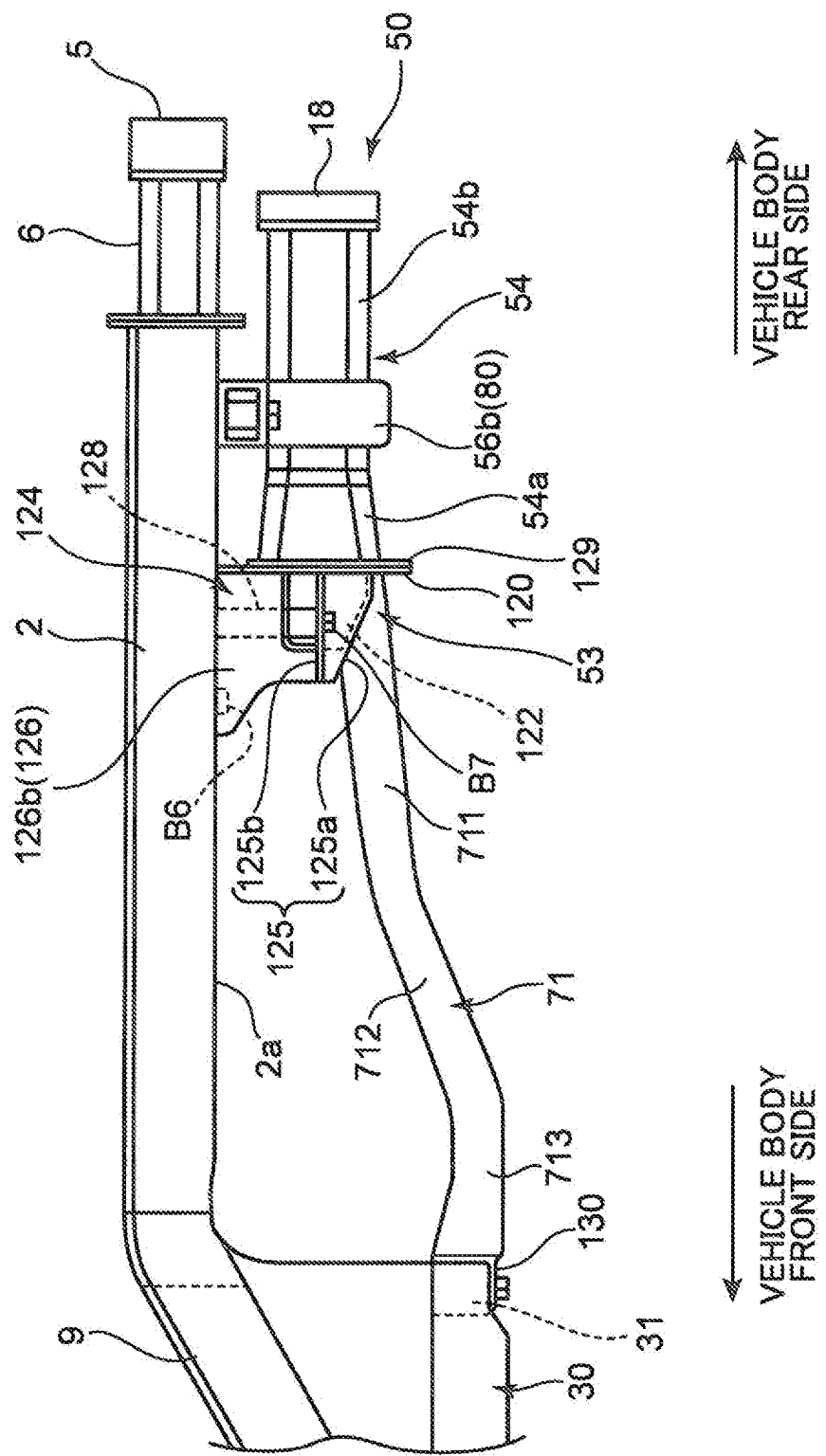
FIG. 21 is a side view of the vehicle body to which the vehicle body rear part structure is applied.
Figure 22:
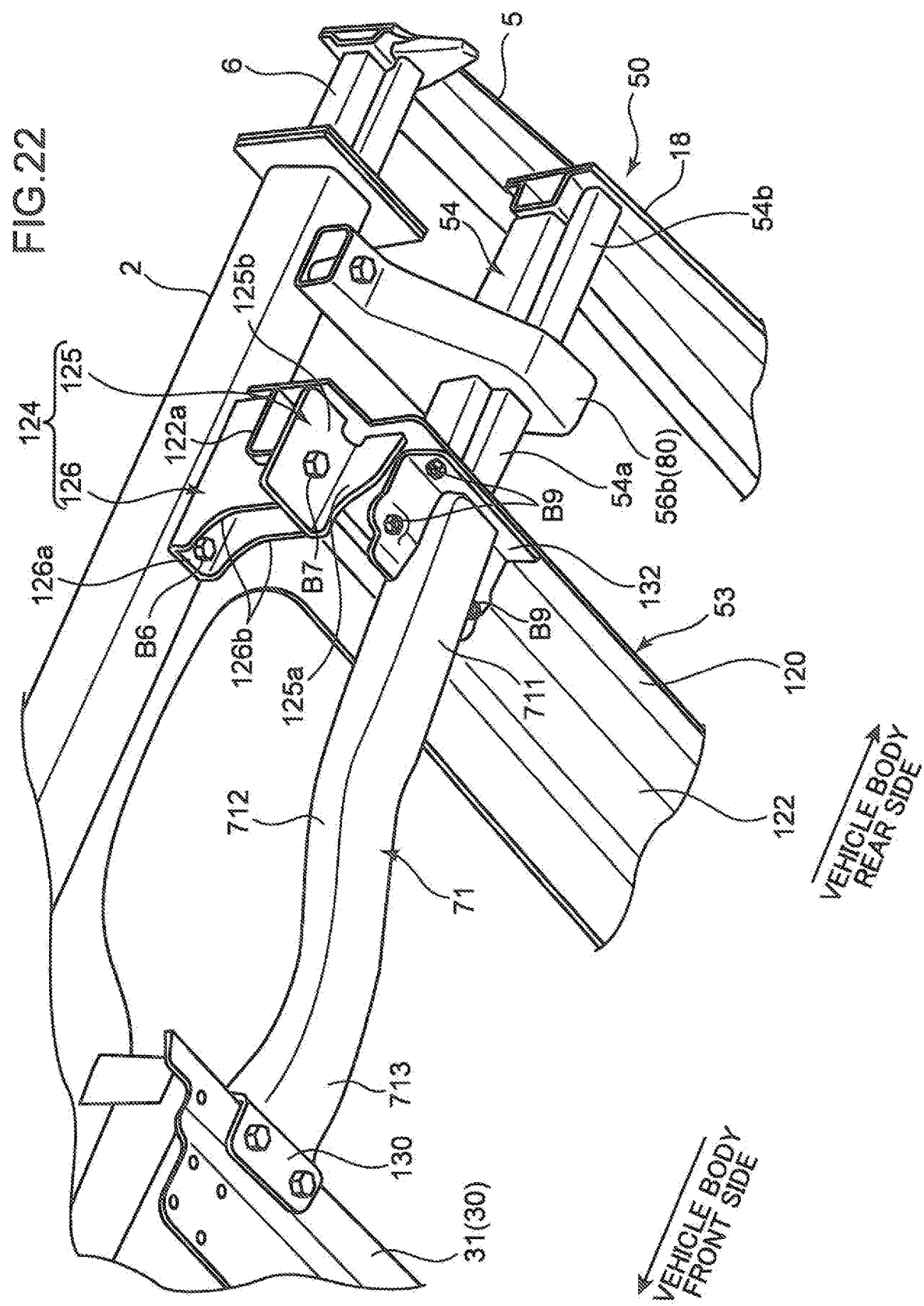
FIG. 22 is a perspective view illustrating essential parts of the vehicle body rear part structure.

FIG. 20 is a bottom view of a vehicle body to which the vehicle body rear part structure for a vehicle according to the second embodiment of the present invention is applied. FIG. 21 is a side view of the vehicle body to which the above vehicle body rear part structure is applied. FIG. 22 is a perspective view illustrating essential parts of the above vehicle body rear part structure. A basic vehicle body rear part structure according to the second embodiment is the same as the vehicle body rear part structure according to the first embodiment. Therefore, in the following description, constituent elements common to those in the vehicle body rear part structure according to the first embodiment are indicated with same reference numerals, and description thereof is omitted or simplified; and mainly differences with respect to the first embodiment are described.

In the above-described first embodiment, the upper cross portion 53 of the rear subframe 50 is constituted by the front frame connecting portions 56a (frame connecting members 80) respectively joined to front surfaces of the left and right front load absorbing portion 54a; and the sub cross member 90 of a closed cross section, which is joined and connected to these front frame connecting portions 56a. On the other hand, in the second embodiment, an upper cross portion 53 is constituted by a cross reinforcement 120, which extends in a vehicle width direction and is joined to each of front surfaces of left and right front load absorbing portions 54a; and a frame member 122 which is joined to a front surface of the cross reinforcement 120 in a vehicle body front-rear direction and extends in the vehicle width direction. Therefore, in a rear subframe 50 in the second embodiment, a sub cross member 90 and a front frame connecting portion 56a are not provided.

The frame member 122 has a U-shape in cross section, and is joined to a front surface of the cross reinforcement 120. With this configuration, the upper cross portion 53 is formed into a closed cross section of a substantially rectangular shape in cross section extending in the vehicle width direction (see FIG. 23).

A connecting bracket 124 is joined to each of both ends of the upper cross portion 53 in the vehicle width direction. The connecting bracket 124 is constituted of a first bracket 125 and a second bracket 126. The first bracket 125 has an inverted L-shape in cross section when viewed from forwardly of the vehicle body, and includes a vertical surface portion 125a extending vertically, and a lateral surface portion 125b extending outwardly in the vehicle width direction from an upper end of the vertical surface portion 125a. The first bracket 125 is joined to the frame member 122 and the cross reinforcement 120 in a state that the vertical surface portion 125a and the lateral surface portion 125b come into contact with a cutout portion formed in an end of the frame member 122. On the other hand, the second bracket 126 has an inverted U-shape in cross section when viewed from forwardly of the vehicle body, and includes an upper surface portion 126a extending forwardly of the vehicle body along the lower surface portion 2a of the rear side frame 2, and a pair of left and right side surface portions 126b suspending from both ends of the upper surface portion 126 in the vehicle width direction. The second bracket 126 is disposed above the first bracket 125 in such a way that an end portion 122a of the frame member 122 is sandwiched by the side surface portions 126b and the lateral surface portion 125b of the first bracket 125. The second bracket 126 is joined to each of the lateral surface portion 125b of the first bracket 125, the frame member 122, and the cross reinforcement 120.

The upper cross portion 53 is connected to the rear side frame 2 via the connecting bracket 124 at positions of both ends of the upper cross portion 53 in the vehicle width direction. Specifically, the upper surface portion 126a of the second bracket 126 and the lower surface portion 2a of the rear side frame 2 are engaged to each other by a bolt B6 and an unillustrated nut, and the lateral surface portion 125b of the first bracket 125 and the lower surface portion 2a of the rear side frame 2 are engaged to each other by a bolt B7 and an unillustrated nut. A tubular member 128 is interposed between the lateral surface portion 125b of the first bracket 125 and the upper surface portion 126a of the second bracket 126, while passing through the frame member 122. The bolt B7 engaging the first bracket 125 and the rear side frame 2 is screwed in a nut fixed to the rear side frame 2 through the tubular member 128.

In the second embodiment, as illustrated in FIG. 21, the front load absorbing portion 54a is formed into such a shape that a vertical size thereof gradually increases, as the front load absorbing portion 54a extends forwardly from a rear side in the vehicle body front-rear direction, and includes a flange portion 129 on a front end thereof. In the second embodiment, the front load absorbing portion 54a is connected to the upper cross portion 53 by engaging the flange portion 129 to the cross reinforcement 120 by an unillustrated bolt and an unillustrated nut.

In the above-described first embodiment, the rear subframe 50 includes: the upper frame portion 52 connected to each of front portions of the left and right front frame connecting portions 56a and extending in the vehicle body front-rear direction; the branch frame member 61 connected to the upper frame portion 52; and the lower frame member 71 extending substantially horizontally from the branch frame member 61 and forwardly of the vehicle body. However, in the second embodiment, the rear subframe 50 does not include an upper frame portion 52 and a branch frame member 61. The lower frame member 71 directly extends from the upper cross portion 53 forwardly of the vehicle body and obliquely downwardly.

The lower frame member 71 includes: a rear portion 711 extending from the upper cross portion 53 forwardly and downwardly of the vehicle body; an intermediate portion 712 extending from a front end of the rear portion 711 forwardly and downwardly of the vehicle body with a larger angle with respect to a horizontal plane, as compared with the rear portion 711; and a front portion 713 extending from a front end of the intermediate portion 712 substantially horizontally and forwardly of the vehicle body.

Furthermore, in the first embodiment, the lower frame member 71 has a flat shape vertically, and is formed in such a way that a lateral width (a size in the vehicle width direction) increases, as extending forwardly of the vehicle body in a certain area on the vehicle body front side. However, in the second embodiment, as illustrated in FIGS. 20 and 21, the lower frame member 71 has a closed cross section of a rectangular shape in cross section in which a lateral width thereof (a size in the vehicle width direction) is substantially the same over the entire area in the front-rear direction in a state that the lateral width is slightly large, as compared with a vertical size. In addition, the front portion 713 of the lower frame member 71 is formed in such a way that a vertical size thereof increases, as extending forwardly from the vehicle body rear side. Specifically, a lower surface of the lower frame member 71 is formed into a substantially horizontal surface, and an upper surface thereof is formed obliquely upwardly, as extending forwardly from the vehicle body rear side with respect to the lower surface as a reference.

Figure 24:
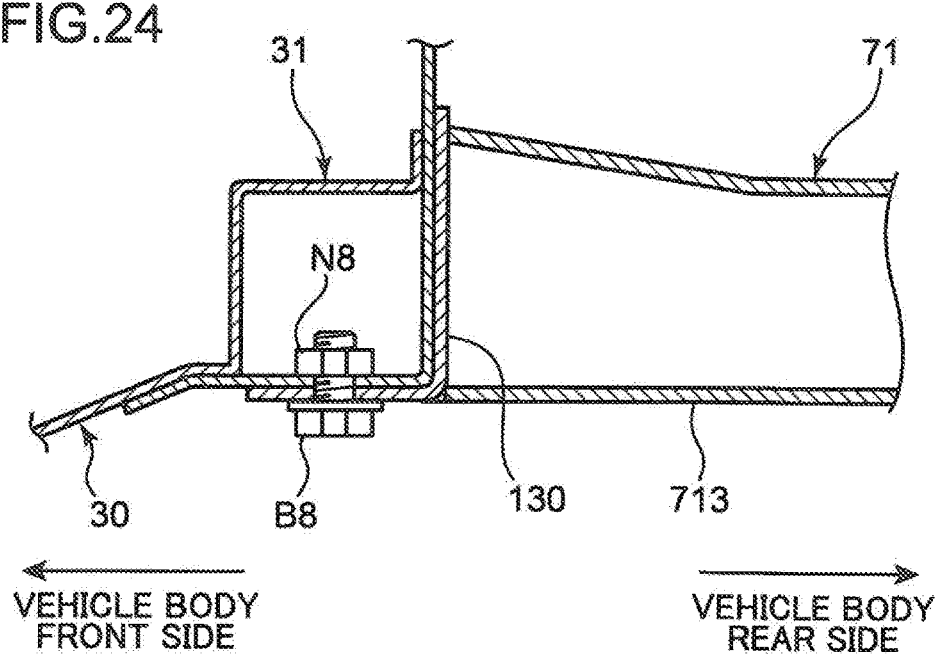
FIG. 24 is a cross-sectional view of a connecting portion between the lower frame member and a battery frame.

As illustrated in FIG. 22, connecting flanges 130 and 132 (a front flange 130 and a rear flange 132) are provided on a front end and a rear end of the lower frame member 71 in the vehicle body front-rear direction. As illustrated in FIG. 24, the front flange 130 is formed into an L-shape in cross section in such a way as to come into contact with a rear surface and a lower surface of a battery frame 30, more specifically, a rear surface and a lower surface of a rear frame 31. The front flange 130 is fixed to the battery frame 30 by a bolt B8 and a nut N8 fixed inside the rear frame 31. With this configuration, a front end of the lower frame member 71 is connected to the battery frame 30.

Figure 23:
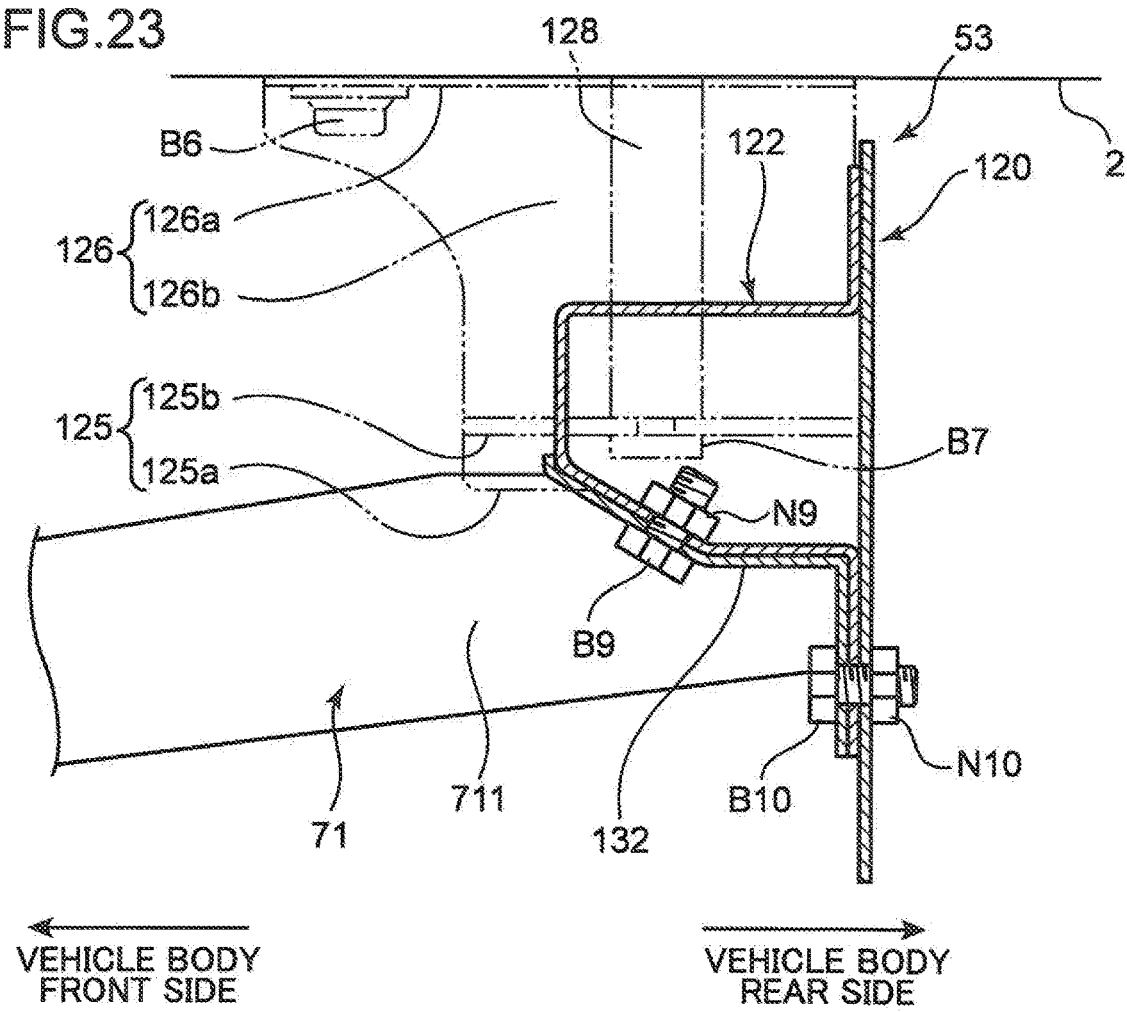
FIG. 23 is a cross-sectional view of a connecting portion between a lower frame member and an upper cross portion.

On the other hand, the rear flange 132 is formed to have a shape in conformity with front surfaces of the frame member 122 and the cross reinforcement 120 of the upper cross portion 53. As illustrated in FIG. 23, the rear flange 132 is fixed to the upper cross portion 53 by a bolt B9 and a nut N9 that is fixed inside the upper cross portion 53 (frame member 122), and a bolt B10 and a nut N10 that is fixed to a rear surface of the cross reinforcement 120. With this configuration, a rear end of the lower frame member 71 is connected to the upper cross portion 53.

In the vehicle body rear part structure according to the second embodiment, although there is a point different from the vehicle body rear part structure according to the first embodiment, operations and advantageous effects substantially equivalent to those in the first embodiment are provided.

Specifically, when a collision load is applied from rearwardly of the vehicle body in rear collision, after the load absorbing portion 6 provided on the rear side frame 2 starts buckling distortion, the collision load is also input to the rear subframe 50, and the load absorbing portion 54 provided on the rear subframe 50 provokes buckling distortion to absorb the collision load. In the rear subframe 50, after the rear load absorbing portion 54b provokes buckling distortion, the front load absorbing portion 54a provokes buckling distortion, so that the collision load is absorbed.

The load input to the rear subframe 50 is transmitted from the upper cross portion 53 of the rear subframe 50 to the rear side frame 2 via the connecting bracket 124 to be transmitted to the vehicle body front side, and is transmitted from the upper cross portion 53 of the rear subframe 50 to the battery frame 30 via the lower frame member 71. Therefore, it is possible to suppress deformation of the rear subframe 50 by dispersing the load input to the rear subframe 50 upwardly of the vehicle body and downwardly of the vehicle body on the vehicle body front side, to protect the accessories 40, 44, and 45 disposed on the vehicle body rear part, when the accessories 40, 44, and 45 are disposed on the vehicle body front side with respect to a rear end of the rear subframe 50 on the vehicle body rear part, and to improve safety of a passenger within a passenger compartment.

The present embodiments describe a vehicle such as an electric vehicle in which the range extender device 40 is disposed on a vehicle body rear part. The present invention is also applicable to a vehicle such as another type of electric vehicle in which an accessory, which is an important safety related component, such as a fuel tank, an electrical storage device, and the like, is disposed on a vehicle body rear part.

The present invention is not limited to the exemplified embodiments, and various improvements and design modifications are available as far as the improvements and design modifications do not depart from the gist of the present invention.

The following is an overview of the present invention described above.

The present invention is directed to a vehicle body rear part structure for a vehicle including a rear side frame extending in a vehicle body front-rear direction on a vehicle body rear part, and a rear subframe disposed below the rear side frame and extending in the vehicle body front-rear direction. The rear subframe includes a front load absorbing portion and a rear load absorbing portion which extend rearwardly of a vehicle body from an important safety related component disposed on the vehicle body rear part, are disposed on a vehicle body rear side with respect to the important safety related component, and are configured to absorb a collision load when the collision load from rearwardly of the vehicle body is applied. The rear load absorbing portion is disposed on the vehicle body rear side of the front load absorbing portion. Strength of the rear load absorbing portion against compression in an axis direction is set low, as compared with strength of the front load absorbing portion.

According to this configuration, the rear subframe disposed below the rear side frame includes the front load absorbing portion and the rear load absorbing portion extending rearwardly of the vehicle body from the important safety related component disposed on the vehicle body rear part, and disposed on the vehicle body rear side with respect to the important safety related component. Strength of the rear load absorbing portion against compression in the axis direction is set low, as compared with strength of the front load absorbing portion.

With this configuration, in the rear subframe, the front load absorbing portion can be provoked buckling distortion, after the rear load absorbing portion away from the important safety related component provokes buckling distortion in rear collision. Thus, the collision load is absorbed by the rear load absorbing portion and the front load absorbing portion of the rear subframe in this order in rear collision. Hence, it is possible to protect the important safety related component disposed on the vehicle body rear part by the rear subframe. In addition, the collision load is absorbed by the rear load absorbing portion and the front load absorbing portion of the rear subframe in this order in rear collision. Hence, it is possible to improve safety of a passenger within a passenger compartment by the rear subframe.

In the above vehicle body rear part structure for a vehicle, the rear subframe includes a frame connecting portion which is disposed between the front load absorbing portion and the rear load absorbing portion, is connected to the front load absorbing portion and the rear load absorbing portion, and is connected to the rear side frame.

According to this configuration, the rear subframe is provided with the frame connecting portion which is disposed between the front load absorbing portion and the rear load absorbing portion, is connected to the front load absorbing portion and the rear load absorbing portion, and is connected to the rear side frame. With this configuration, the front load absorbing portion and the rear load absorbing portion are connected to the frame connecting portion connected to the rear side frame. Thus, bending rigidity is increased, as compared with a case where the front load absorbing portion and the rear load absorbing portion are integrally formed. Hence, it is possible to effectively cause the rear load absorbing portion and the front load absorbing portion to provoke buckling distortion in rear collision.

In the above body rear part structure for a vehicle, each of the front load absorbing portion and the rear load absorbing portion includes a closed cross-sectional portion which is formed into a closed cross section on an orthogonal cross section orthogonal to the vehicle body front-rear direction. The frame connecting portion includes a load transmitting portion which extends in the vehicle body front-rear direction, and is configured to transmit a collision load from the front load absorbing portion to the rear load absorbing portion, when the collision load from rearwardly of the vehicle body is applied. The load transmitting portion is formed to have a same cross section as the closed cross-sectional portion of the front load absorbing portion and the closed cross-sectional portion of the rear load absorbing portion on the orthogonal cross section orthogonal to the vehicle body front-rear direction.

According to this configuration, the frame connecting portion includes the load transmitting portion extending in the vehicle body front-rear direction. The load transmitting portion is formed to have a same cross section as the closed cross-sectional portion of the front load absorbing portion and the closed cross-sectional portion of the rear load absorbing portion. Therefore, it is possible to effectively transmit the collision load from the rear load absorbing portion to the front load absorbing portion in rear collision. Furthermore, it is possible to increase bending rigidity, as compared with a case where the load transmitting portion is formed to have a cross section different from a closed cross-sectional portion of the front load absorbing portion and a closed cross-sectional portion of the rear load absorbing portion, and to effectively cause the rear load absorbing portion and the front load absorbing portion to provoke buckling distortion in rear collision.

In the above vehicle body rear part structure for a vehicle, each of the closed cross-sectional portion of the front load absorbing portion, the closed cross-sectional portion of the rear load absorbing portion, and the load transmitting portion of the frame connecting portion is formed into a polygonal shape in cross section having sides of a number larger than the number of sides of a rectangular shape in cross section. The frame connecting portion includes a peripheral wall portion formed into a closed cross section on an orthogonal cross section orthogonal to a vehicle width direction. The frame connecting portion is formed within the peripheral portion in such a way that a vehicle body front portion of the load transmitting portion is abutted on and jointed to a vehicle body front portion of the peripheral wall portion, and that a vehicle body rear portion of the load transmitting portion is abutted on and joined to a vehicle body rear portion of the peripheral wall portion.

According to this configuration, each of the closed cross-sectional portion of the front load absorbing portion, the closed cross-sectional portion of the rear load absorbing portion, and the load transmitting portion of the frame connecting portion is formed into a polygonal shape in cross section having sides of a number larger than the number of sides of a rectangular shape in cross section. Thus, it is possible to increase strength against compression in the axis direction by increasing the number of ridge lines, as compared with a case where the above-described portions are formed into a rectangular shape in cross section, and it is possible to more effectively acquire the above-described advantageous effects.

Moreover, if it is assumed that the load transmitting portion is joined to the peripheral wall portion by a flange portion provided on each of an end of a vehicle body front side of the load transmitting portion and an end of a vehicle body rear side of the load transmitting portion, stress may be concentratedly applied to a portion other than the flange portions of the end of the vehicle body front side and the end of the vehicle body rear side of the load transmitting portion in rear collision, to cause deformation, which may makes it impossible to effectively absorb the collision load. However, according to the above configuration, since a vehicle body front side of the load transmitting portion is abutted on and joined to a vehicle body front side of the peripheral wall portion, and a vehicle body rear side of the load transmitting portion is abutted on and jointed to a vehicle body rear side of the peripheral wall portion, it is possible to suppress concentration of stress, and to effectively absorb the collision load by the front load absorbing portion and the rear load absorbing portion in rear collision.

In the above vehicle body rear part structure for a vehicle, an accessory which excludes the important safety related component, and is disposed at a position where the accessory overlaps the front load absorbing portion in the vehicle body front-rear direction, is further included.

According to this configuration, an accessory which excludes the important safety related component, and is disposed at a position where the accessory overlaps the front load absorbing portion in the vehicle body front-rear direction, is further included. Thus, it is possible to protect the important safety related component in rear collision, and to prevent damage of the accessory disposed at a position where the accessory overlaps the front load absorbing portion in the vehicle body front-rear direction, when only the rear load absorbing portion provokes buckling distortion.

In the above vehicle body rear part structure for a vehicle, the rear subframe includes a cross portion which extends in a vehicle width direction below the rear side frame and at a position of a vehicle body rear side with respect to the important safety related component, both ends of which are connected to the rear side frame, and is formed into a closed cross section. A front end of the front load absorbing portion is connected to the cross portion.

According to this configuration, it is possible to successfully cause the front load absorbing portion and the rear load absorbing portion to provoke buckling distortion, while receiving the load from the cross portion connected to the rear subframe. Therefore, it is possible to effectively protect the important safety related component disposed on the vehicle body rear part by the rear subframe.

INDUSTRIAL APPLICABILITY

As described above, according to the present invention, in a vehicle provided with a rear subframe disposed below a rear side frame, it is possible to protect an important safety related component, and to improve safety of a passenger within a passenger compartment by absorbing a collision load in rear collision. Therefore, there is a possibility that the present invention is advantageously used in the industrial field of manufacturing a vehicle of this type.

The invention claimed is:
1. A vehicle body rear part structure for a vehicle, comprising:
a rear side frame which extends in a vehicle body front-rear direction on a vehicle body rear part;
a rear subframe which is disposed below the rear side frame, and extends in the vehicle body front-rear direction;
a torsion beam suspension device which is disposed on a vehicle body rear part, and includes a torsion beam extending in a vehicle width direction; and
an important safety related component which is disposed on a vehicle body rear side of the torsion beam, and is mounted on the rear subframe, wherein
the rear subframe includes a front load absorbing portion and a rear load absorbing portion which extend rearwardly of a vehicle body from the important safety related component disposed on the vehicle body rear part, are disposed on a vehicle body rear side with respect to the important safety related component, and are configured to absorb a collision load when the collision load from rearwardly of the vehicle body is applied,
the important safety related component includes at least one of a power generator and an electrical storage device,
the rear load absorbing portion is disposed on the vehicle body rear side of the front load absorbing portion, and
strength of the rear load absorbing portion against compression in an axis direction is set low, as compared with strength of the front load absorbing portion.

2. The vehicle body rear part structure for the vehicle according to claim 1, wherein
the rear subframe includes a frame connecting portion which is disposed between the front load absorbing portion and the rear load absorbing portion, is connected to the front load absorbing portion and the rear load absorbing portion, and is connected to the rear side frame.

3. The vehicle body rear part structure for the vehicle according to claim 2, wherein
each of the front load absorbing portion and the rear load absorbing portion includes a closed cross-sectional portion which is formed into a closed cross section on an orthogonal cross section orthogonal to the vehicle body front-rear direction,
the frame connecting portion includes a load transmitting portion which extends in the vehicle body front-rear direction, and is configured to transmit a collision load from the front load absorbing portion to the rear load absorbing portion, when the collision load from rearwardly of the vehicle body is applied, and
the load transmitting portion is formed to have a same cross section as the closed cross-sectional portion of the front load absorbing portion and the closed cross-sectional portion of the rear load absorbing portion on the orthogonal cross section orthogonal to the vehicle body front-rear direction.

4. The vehicle body rear part structure for the vehicle according to claim 3, wherein
each of the closed cross-sectional portion of the front load absorbing portion, the closed cross-sectional portion of the rear load absorbing portion, and the load transmitting portion of the frame connecting portion is formed into a polygonal shape in cross section having sides of a number larger than the number of sides of a rectangular shape in cross section,
the frame connecting portion includes a peripheral wall portion formed into a closed cross section on an orthogonal cross section orthogonal to a vehicle width direction, and the frame connecting portion is formed within the peripheral wall portion in such a way that a vehicle body front portion of the load transmitting portion is abutted on and jointed to a vehicle body front portion of the peripheral wall portion, and that a vehicle body rear portion of the load transmitting portion is abutted on and joined to a vehicle body rear portion of the peripheral wall portion.

5. The vehicle body rear part structure for the vehicle according to claim 1, further comprising an accessory which excludes the important safety related component, and is disposed at a position where the accessory overlaps the front load absorbing portion in the vehicle body front-rear direction.

6. The vehicle body rear part structure for the vehicle according to claim 1, wherein the rear subframe includes a cross portion which extends in a vehicle width direction below the rear side frame and at a position of a vehicle body rear side with respect to the important safety related component, both ends of which are connected to the rear side frame, and is formed into a closed cross section, and
a front end of the front load absorbing portion is connected to the cross portion.

7. The vehicle body rear part structure for the vehicle according to claim 2, further comprising an accessory which excludes the important safety related component, and is disposed at a position where the accessory overlaps the front load absorbing portion in the vehicle body front-rear direction.

8. The vehicle body rear part structure for the vehicle according to claim 3, further comprising an accessory which excludes the important safety related component, and is disposed at a position where the accessory overlaps the front load absorbing portion in the vehicle body front-rear direction.

9. The vehicle body rear part structure for the vehicle according to claim 4, further comprising an accessory which excludes the important safety related component, and is disposed at a position where the accessory overlaps the front load absorbing portion in the vehicle body front-rear direction.

10. The vehicle body rear part structure for the vehicle according to claim 2, wherein
the rear subframe includes a cross portion which extends in a vehicle width direction below the rear side frame and at a position of a vehicle body rear side with respect to the important safety related component, both ends of which are connected to the rear side frame, and is formed into a closed cross section, and
a front end of the front load absorbing portion is connected to the cross portion.

11. The vehicle body rear part structure for the vehicle according to claim 3, wherein
the rear subframe includes a cross portion which extends in a vehicle width direction below the rear side frame and at a position of a vehicle body rear side with respect to the important safety related component, both ends of which are connected to the rear side frame, and is formed into a closed cross section, and
a front end of the front load absorbing portion is connected to the cross portion.

12. The vehicle body rear part structure for the vehicle according to claim 4, wherein
the rear subframe includes a cross portion which extends in a vehicle width direction below the rear side frame and at a position of a vehicle body rear side with respect to the important safety related component, both ends of which are connected to the rear side frame, and is formed into a closed cross section, and
a front end of the front load absorbing portion is connected to the cross portion.

13. The vehicle body rear part structure for the vehicle according to claim 5, wherein
the rear subframe includes a cross portion which extends in a vehicle width direction below the rear side frame and at a position of a vehicle body rear side with respect to the important safety related component, both ends of which are connected to the rear side frame, and is formed into a closed cross section, and
a front end of the front load absorbing portion is connected to the cross portion.

* * * * *